US012696068B2

(12) United States Patent
Liang

(10) Patent No.: US 12,696,068 B2
(45) Date of Patent: Jul. 28, 2026

(54) METHOD, DEVICE AND COMPUTER PROGRAM PRODUCT FOR WIRELESS COMMUNICATION

(71) Applicant: ZTE CORPORATION, Shenzhen (CN)

(72) Inventor: Shuang Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 18/521,231

(22) Filed: Nov. 28, 2023

(65) Prior Publication Data

US 2024/0171963 A1     May 23, 2024

Related U.S. Application Data

(63) Continuation of application No. PCT/CN2021/105558, filed on Jul. 9, 2021.

(51) Int. Cl.
H04W 8/02          (2009.01)

(52) U.S. Cl.
CPC ..................................... H04W 8/02 (2013.01)

(58) Field of Classification Search
None
See application file for complete search history.

(56) References Cited

U.S. PATENT DOCUMENTS

| | | | |
|---|---|---|---|
| 10,986,568 B1 | 4/2021 | Jagannatha et al. | |
| 2019/0159115 A1 | 5/2019 | Russell et al. | |

| | | | |
|---|---|---|---|
| 2019/0182655 A1 | 6/2019 | Gupta et al. | |
| 2020/0178153 A1* | 6/2020 | Jun ..................... | H04W 40/248 |
| 2023/0143638 A1* | 5/2023 | Casati ................... | H04W 48/18 |
| | | | 455/435.2 |

FOREIGN PATENT DOCUMENTS

| | | |
|---|---|---|
| CN | 101232628 A | 7/2008 |
| CN | 102026328 A | 4/2011 |
| CN | 103503522 A | 1/2014 |
| CN | 108347751 A | 7/2018 |
| CN | 109906632 A | 6/2019 |
| EP | 4 080 940 A1 | 10/2022 |
| EP | 4 138 438 A1 | 2/2023 |
| WO | WO-2021/089688 A1 | 5/2021 |
| WO | WO-2021/137526 A1 | 7/2021 |
| WO | WO-2021/162503 A1 | 8/2021 |

OTHER PUBLICATIONS

Extended European Search Report for EP Appl. No. 21948880.6, dated Jun. 25, 2024 (10 pages).

(Continued)

*Primary Examiner* — Frantz Bataille
(74) *Attorney, Agent, or Firm* — Foley & Lardner LLP

(57) ABSTRACT

Method, device and computer program product for wireless communication are provided. A method includes: receiving, by a wireless communication terminal from an access and mobility management node, updated prioritization information of at least one of Visitor Public Land Mobile Networks, VPLMNs, or access technology; and updating, by the wireless communication terminal, a prioritization of at least one of VPLMN or access technology for Public Land Mobile Network, PLMN, selection according to the updated prioritization information.

18 Claims, 22 Drawing Sheets

(56) References Cited

OTHER PUBLICATIONS

International Search Report and Written Opinion for PCT Appl. No. PCT/CN2021/105558 mailed Mar. 28, 2022 (7 pages).
First Office Action on CN Appl. No. 202180099682.4 dated Apr. 24, 2026 (20 pages).
Huawei, et al., "Misalignment between UE and AMF on SoR during the registration," 3GPP TSG CT WG1 Meeting #115, C1-191289, Montreal, Feb. 18, 2019 (5 pages).

* cited by examiner

FIG. 10B receiving, by a wireless communication terminal from an access and mobility management node , updated prioritization information of at least one of Visitor Public Land Mobile Networks, VPLMNs, or access technology S11 updating, by the wireless communication terminal, a prioritization of at least one of VPLMN or access technology for Public Land Mobile Network, PLMN, selection according to the updated prioritization information S12

FIG. 13 receiving, by an access and mobility management node from a managing node, updated prioritization information of at least one of Visitor Public Land Mobile Networks, VPLMNs, or access technology S21 transmitting, by the access and mobility management node to a wireless communication terminal, the updated prioritization information to allow the wireless communication terminal to update a prioritization at least one of VPLMN or access technology for Public Land Mobile Network, PLMN, selection according to the updated prioritization information S22

FIG. 14 acquiring, by a unified data node , updated prioritization information of at least one of Visitor Public Land Mobile Networks, VPLMNs, or access technology S31 transmitting, by the unified data node, the updated prioritization information to the wireless communication terminal to allow the wireless communication terminal to update a prioritization of at least one of VPLMN or access technology for PLMN selection according to the updated prioritization information S32

FIG. 15 generating, by a network node, updated prioritization information of at least one of Visitor Public Land Mobile Networks, VPLMNs, or access technology in response to a configuration of at least one network slice supported by the one or more VPLMNs subscribed by a wireless communication terminal being changed  S41 transmitting, by the network node, the updated prioritization information to the wireless communication terminal to allow the wireless communication terminal to update a prioritization of at least one of VPLMN or access technology for PLMN selection according to the updated prioritization information S42

FIG. 16 receiving, by a first control node from a second control node, updated prioritization information of at least one of Visitor Public Land Mobile Networks, VPLMNs, or access technology S51 transmitting, by the first control node to a wireless communication terminal, the updated prioritization information to allow the wireless communication terminal to update a prioritization of at least one of VPLMN or access technology for PLMN selection according to the updated prioritization information S52

FIG. 17 generating, by a second control node , updated prioritization information of at least one of Visitor Public Land Mobile Networks, VPLMNs, or access technology in response to a configuration of at least one network slice supported by the one or more VPLMNs subscribed by a wireless communication terminal being changed S61 transmitting, by the second control node, the updated prioritization information to the wireless communication terminal via a first control node to allow the wireless communication terminal to update a prioritization of at least one of VPLMN or access technology for Public Land Mobile Network, PLMN, selection according to the updated prioritization information S62

FIG. 18

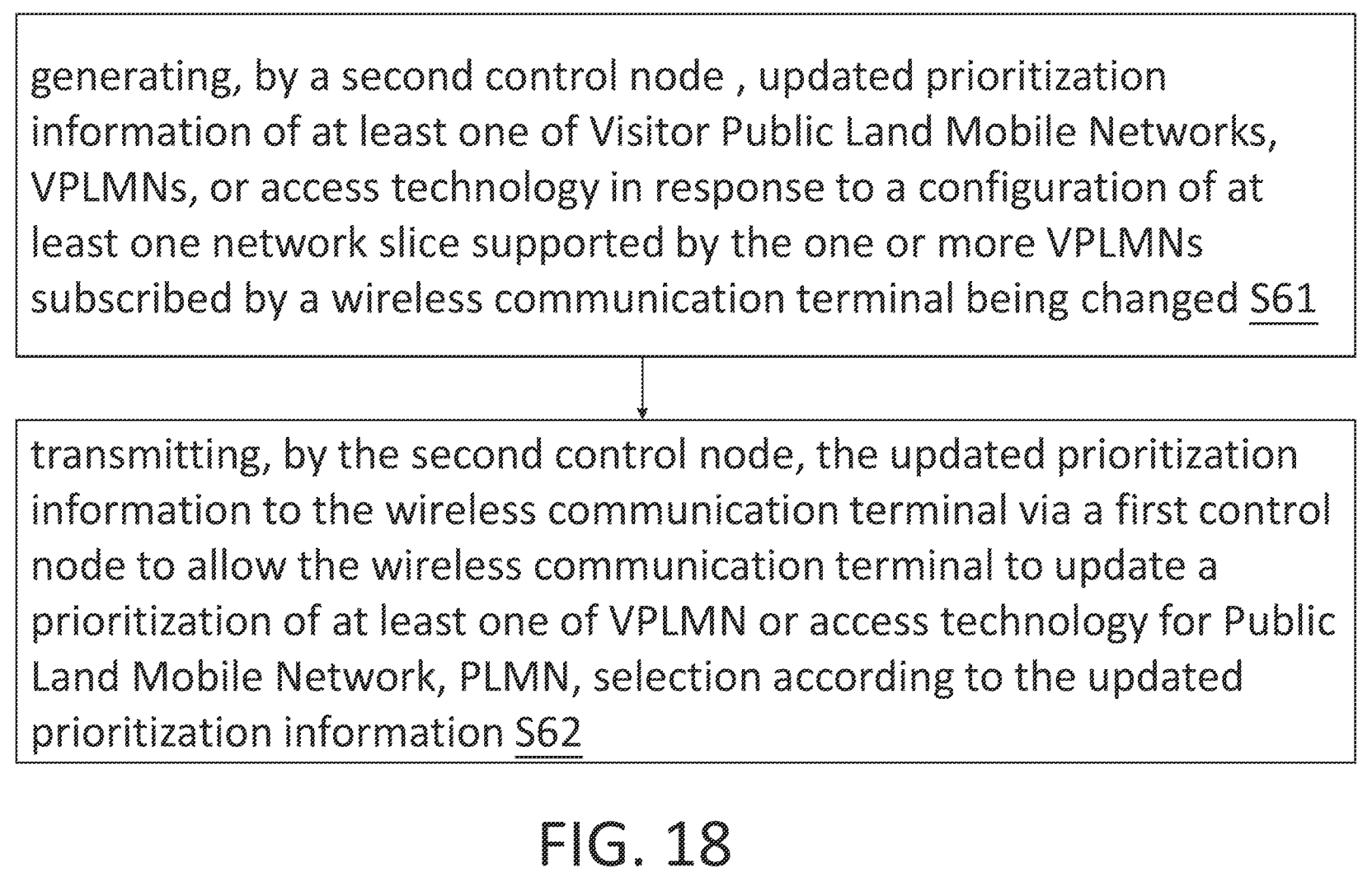

METHOD, DEVICE AND COMPUTER PROGRAM PRODUCT FOR WIRELESS COMMUNICATION

CROSS-REFERENCE TO RELATED PATENT APPLICATIONS

This application is a Continuation of PCT Application No. PCT/CN2021/105558, filed Jul. 9, 2021, incorporated herein by reference in its entirety.

TECHNICAL FIELD

This document is directed generally to wireless communications, in particular to $5^{th}$ generation (5G) wireless communications.

BACKGROUND

A network slice refers to a logical network that has specific network capabilities and network characteristics. A network slice instance refers to a set of Network Function instances and the required resources (e.g., compute, storage and networking resources), and the set of Network Function instances and the required resources form a deployed network slice.

SUMMARY

A roaming UE (user equipment) may stay in an area covered by different PLMNs (Public Land Mobile Networks). Each PLMN provides different services via different network slices. The UE can subscribe several services. When a roaming UE activates a service and/or application requiring a network slice not offered by the serving VPLMN (Visitor Public Land Mobile Network) but available in the area from other VPLMN(s), it is unclear how the HPLMN (Home Public Land Mobile Network) provides the UE the prioritization information of the VPLMNs and/or access technology that allows the UE to register for the network slice.

The present disclosure relates to methods, devices, and computer program products for providing prioritization information for network slice(s).

One aspect of the present disclosure relates to a wireless communication method. In an embodiment, the wireless communication method includes: receiving, by a wireless communication terminal from an access and mobility management node, updated prioritization information of at least one of Visitor Public Land Mobile Networks, VPLMNs, or access technology; and updating, by the wireless communication terminal, a prioritization of at least one of VPLMN or access technology for Public Land Mobile Network, PLMN, selection according to the updated prioritization information.

Another aspect of the present disclosure relates to a wireless communication method. In an embodiment, the wireless communication method includes: receiving, by an access and mobility management node from a managing node, updated prioritization information of at least one of Visitor Public Land Mobile Networks, VPLMNs, or access technology; and transmitting, by the access and mobility management node to a wireless communication terminal, the updated prioritization information to allow the wireless communication terminal to update a prioritization at least one of VPLMN or access technology for Public Land Mobile Network, PLMN, selection according to the updated prioritization information.

Another aspect of the present disclosure relates to a wireless communication method. In an embodiment, the wireless communication method includes: acquiring, by a unified data node, updated prioritization information of at least one of Visitor Public Land Mobile Networks, VPLMNs, or access technology; and transmitting, by the unified data node, the updated prioritization information to the wireless communication terminal to allow the wireless communication terminal to update a prioritization of at least one of VPLMN or access technology for PLMN selection according to the updated prioritization information.

Another aspect of the present disclosure relates to a wireless communication method. In an embodiment, the wireless communication method includes: generating, by a network node, updated prioritization information of at least one of Visitor Public Land Mobile Networks, VPLMNs, or access technology in response to a configuration of at least one network slice supported by the one or more VPLMNs subscribed by a wireless communication terminal being changed; and transmitting, by the network node, the updated prioritization information to the wireless communication terminal to allow the wireless communication terminal to update a prioritization of at least one of VPLMN or access technology for PLMN selection according to the updated prioritization information.

Another aspect of the present disclosure relates to a wireless communication method. In an embodiment, the wireless communication method includes: receiving, by a first control node from a second control node, updated prioritization information of at least one of Visitor Public Land Mobile Networks, VPLMNs, or access technology; and transmitting, by the first control node to a wireless communication terminal, the updated prioritization information to allow the wireless communication terminal to update a prioritization of at least one of VPLMN or access technology for PLMN selection according to the updated prioritization information.

Another aspect of the present disclosure relates to a wireless communication method. In an embodiment, the wireless communication method includes: generating, by a second control node, updated prioritization information of at least one of Visitor Public Land Mobile Networks, VPLMNs, or access technology in response to a configuration of at least one network slice supported by the one or more VPLMNs subscribed by a wireless communication terminal being changed; and transmitting, by the second control node, the updated prioritization information to the wireless communication terminal via a first control node to allow the wireless communication terminal to update a prioritization of at least one of VPLMN or access technology for Public Land Mobile Network, PLMN, selection according to the updated prioritization information.

Another aspect of the present disclosure relates to a wireless communication terminal. In an embodiment, the wireless communication terminal includes a communication unit and a processor. The processor is configured to: receive, from an access and mobility management node, updated prioritization information of at least one of Visitor Public Land Mobile Networks, VPLMNs, or access technology; and update, by the wireless communication terminal, a prioritization of at least one of VPLMN or access technology for Public Land Mobile Network, PLMN, selection according to the updated prioritization information.

Another aspect of the present disclosure relates to a wireless communication node. In an embodiment, the wireless communication node includes a communication unit and a processor. The processor is configured to: receive, from a managing node, updated prioritization information of at least one of Visitor Public Land Mobile Networks, VPLMNs, or access technology; and transmit, to a wireless communication terminal, the updated prioritization information to allow the wireless communication terminal to update a prioritization at least one of VPLMN or access technology for Public Land Mobile Network, PLMN, selection according to the updated prioritization information.

Another aspect of the present disclosure relates to a wireless communication node. In an embodiment, the wireless communication node includes a communication unit and a processor. The processor is configured to: acquire updated prioritization information of at least one of Visitor Public Land Mobile Networks, VPLMNs, or access technology; and transmit the updated prioritization information to the wireless communication terminal to allow the wireless communication terminal to update a prioritization of at least one of VPLMN or access technology for PLMN selection according to the updated prioritization information.

Another aspect of the present disclosure relates to a wireless communication node. In an embodiment, the wireless communication node includes a communication unit and a processor. The processor is configured to: generate updated prioritization information of at least one of Visitor Public Land Mobile Networks, VPLMNs, or access technology in response to a configuration of at least one network slice supported by the one or more VPLMNs subscribed by a wireless communication terminal being changed; and transmit the updated prioritization information to the wireless communication terminal to allow the wireless communication terminal to update a prioritization of at least one of VPLMN or access technology for PLMN selection according to the updated prioritization information.

Another aspect of the present disclosure relates to a wireless communication node. In an embodiment, the wireless communication node includes a communication unit and a processor. The processor is configured to: receive, from a second control node, updated prioritization information of at least one of Visitor Public Land Mobile Networks, VPLMNs, or access technology; and transmit, to a wireless communication terminal, the updated prioritization information to allow the wireless communication terminal to update a prioritization of at least one of VPLMN or access technology for PLMN selection according to the updated prioritization information.

Another aspect of the present disclosure relates to a wireless communication node. In an embodiment, the wireless communication node includes a communication unit and a processor. The processor is configured to: generate updated prioritization information of at least one of Visitor Public Land Mobile Networks, VPLMNs, or access technology in response to a configuration of at least one network slice supported by the one or more VPLMNs subscribed by a wireless communication terminal being changed; and transmit the updated prioritization information to the wireless communication terminal via a first control node to allow the wireless communication terminal to update a prioritization of at least one of VPLMN or access technology for Public Land Mobile Network, PLMN, selection according to the updated prioritization information.

Various embodiments may preferably implement the following features:

Preferably or in some embodiments, the wireless communication terminal is configured to perform Public Land Mobile Network, PLMN, selection according to the updated prioritization information.

Preferably or in some embodiments, the wireless communication terminal is configured to transmit an update acknowledgment message to the access and mobility management node in response to the updated prioritization information being received by the wireless communication terminal.

Preferably or in some embodiments, the wireless communication terminal is configured to transmit the update acknowledgment message in response to an acknowledgment request being received.

Preferably or in some embodiments, the access and mobility management node is configured to receive an update acknowledgment message from the wireless communication terminal in response to the updated prioritization information being transmitted to the wireless communication terminal.

Preferably or in some embodiments, the access and mobility management node is configured to transmit the update acknowledgment message from the wireless communication terminal to the managing node.

Preferably or in some embodiments, the access and mobility management node is configured to receive the update acknowledgment message in response to an acknowledgment request being transmitted to the wireless communication terminal.

Preferably or in some embodiments, the unified data node is configured to transmit a request message to an application node and receive the updated prioritization information from the application node.

Preferably or in some embodiments, the unified data node is configured to notify an application node that at least one network slice supported by one or more VPLMN subscribed by a wireless communication terminal being changed.

Preferably or in some embodiments, the unified data node is configured to acquire the updated prioritization information from the application node via a Unified Data Repository.

Preferably or in some embodiments, the unified data node is configured to transmit an acknowledgment request for the updated prioritization information to the wireless communication terminal.

Preferably or in some embodiments, the unified data node is configured to receive an update acknowledgment message from the wireless communication terminal in response to the updated prioritization information being transmitted to the wireless communication terminal.

Preferably or in some embodiments, the network node is configured to transmit an acknowledgment request for the updated prioritization information to the wireless communication terminal.

Preferably or in some embodiments, the network node is configured to receive an update acknowledgment message from the wireless communication terminal in response to the updated prioritization information being transmitted to the wireless communication terminal.

Preferably or in some embodiments, the first control node is configured to transmit an acknowledgment request for the updated prioritization information to the wireless communication terminal.

Preferably or in some embodiments, the first control node is configured to receive an update acknowledgment message from the wireless communication terminal in response to the updated prioritization information being transmitted to the wireless communication terminal.

Preferably or in some embodiments, the first control node is configured to transmit the update acknowledgment message from the wireless communication terminal to the second control node.

Preferably or in some embodiments, the second control node is configured to transmit an acknowledgment request for the updated prioritization information to the wireless communication terminal via the first control node.

Preferably or in some embodiments, the second control node is configured to receive an update acknowledgment message from the wireless communication terminal via the first control node in response to the updated prioritization information being transmitted to the wireless communication terminal.

The present disclosure relates to a computer program product including a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIGS. 10A and 10B show a schematic diagram of an update procedure according to an embodiment of the present disclosure.

FIG. 13 shows a flowchart of a wireless communication method according to an embodiment of the present disclosure.

FIG. 14 shows a flowchart of another wireless communication method according to an embodiment of the present disclosure.

FIG. 15 shows a flowchart of another wireless communication method according to an embodiment of the present disclosure.

FIG. 16 shows a flowchart of another wireless communication method according to an embodiment of the present disclosure.

FIG. 17 shows a flowchart of another wireless communication method according to an embodiment of the present disclosure.

FIG. 18 shows a flowchart of another wireless communication method according to an embodiment of the present disclosure.

DETAILED DESCRIPTION

Figure 1:
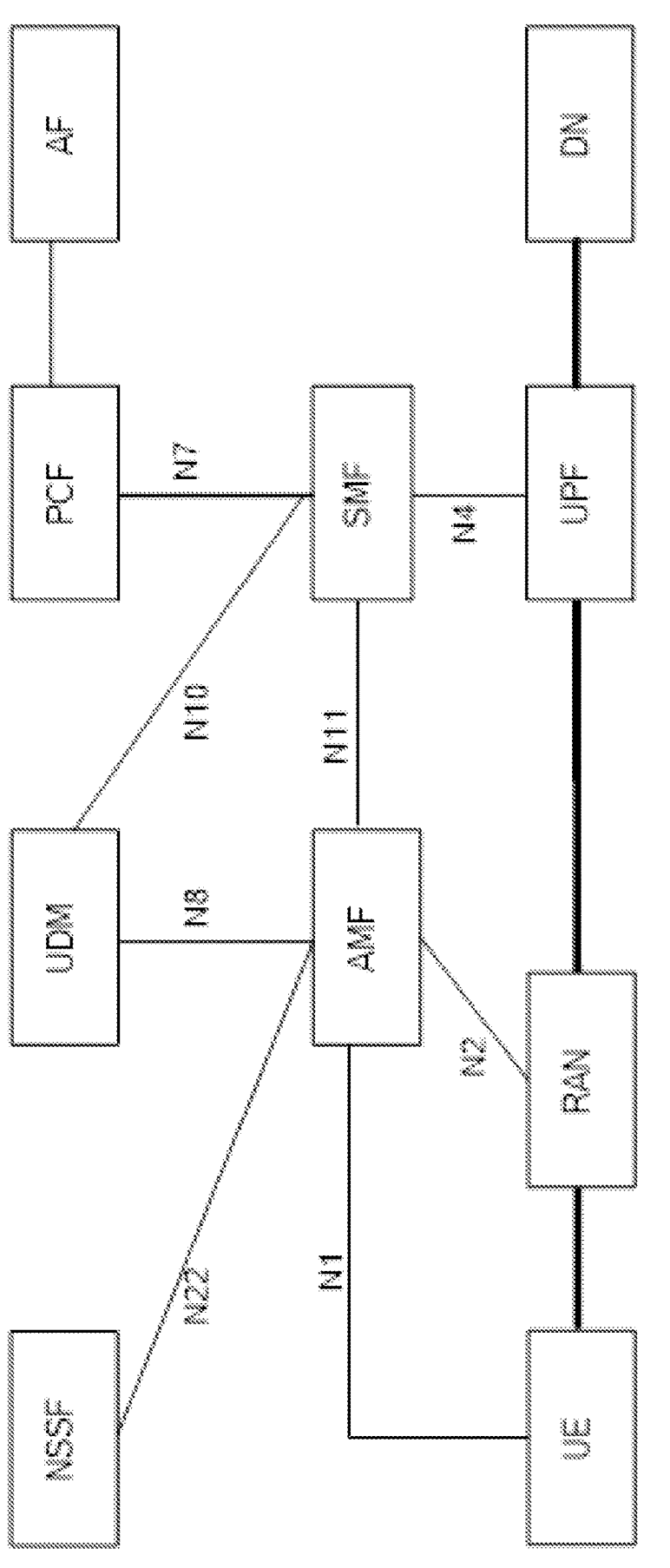
FIG. 1 shows 5G System (5GS) architecture according to an embodiment of the present disclosure.

FIG. 1 shows 5G System (5GS) architecture. In an embodiment, 5GS architecture consists of the following network functions (NFs):

1) UE, User Equipment.
2) RAN, Radio Access Network.
3) AMF, Access and Mobility Management Function. This network function (NF) includes functionalities such as UE Mobility Management, Reachability Management, Connection Management and Registration Management. The AMF terminates the RAN (radio access network) control plane (CP) interface N2 and NAS (non-access stratum) interface N1, NAS ciphering and integrity protection. It also distributes the SM (Structural-to-Modular) NAS to the proper SMFs (Session Management Functions) via N11 interface.

During the registration procedure, the AMF may determine the Allowed NSSAI (network slice Selection Assistance information) and the Rejected NSSAI with rejection cause based on the Requested NSSAI received from the UE. The AMF further determines the Registration Area within which the UE can use all S-NSSAIs (Single-network slice Selection Assistance information) of the Allowed NSSAI. The AMF sends the Allowed NSSAI, the Rejected NSSAI with rejection cause and the Registration Area to the UE.

4) UDM, Unified Data Management. This NF manages the subscription profile for the UEs. The subscription data is stored in the Unified Data Repository (UDR). The subscription information includes the data used for Mobility Management and Session Management. The AMF and the SMF retrieve the subscription data from the UDM.

5) NSSF, network slice Selection Function. This NF supports the following functionality: selecting the set of network slice instances serving the UE; determining the Allowed NSSAI and, if needed, the mapping to the HPLMN S-NSSAIs; determining the Configured NSSAI and, if needed, the mapping to the HPLMN S-NSSAIs; determining the AMF Set to be used to serve the UE, or, based on a configuration, a list of candidate AMF(s), possibly by querying the Network Repository Function (NRF).

In the case of home-routed roaming, there are two main options depending on the operators' choices in terms of involvement of the NRF, the NSSF and the configuration of the AMF. One option is that the HPLMN and the VPLMN deploy an NSSF separately (referred to as vNSSF and hNSSF).

6) SMF, Session Management Function. This NF includes the following functionalities: session establishment, modification and release; UE IP address allocation and management; selection and control of user plane (UP) function, etc.

7) UPF, User Plane Function. This NF serves as an anchor point for intra-/inter-radio access technology (RAT) mobility and as the external PDU session point of interconnect to the Data Network (DN). The UPF also routes and forwards the data packet according to the indication from the SMF. It also buffers the downlink (DL) data when the UE is in an idle mode.

8) AF, Application Function. This NF interacts with the 3GPP Core Network in order to provide services, for example, to support application influence on traffic routing, accessing NEF, interacting with the policy framework for policy control, etc.

9) PCF, Policy Control Function. This NF supports unified policy framework to govern network behavior. The PCF provides access management policy to the AMF, or session management policy to SMF, or UE policy to the UE. The PCF can access the UDR to obtain the subscription information relevant for policy decisions.

Figure 2:
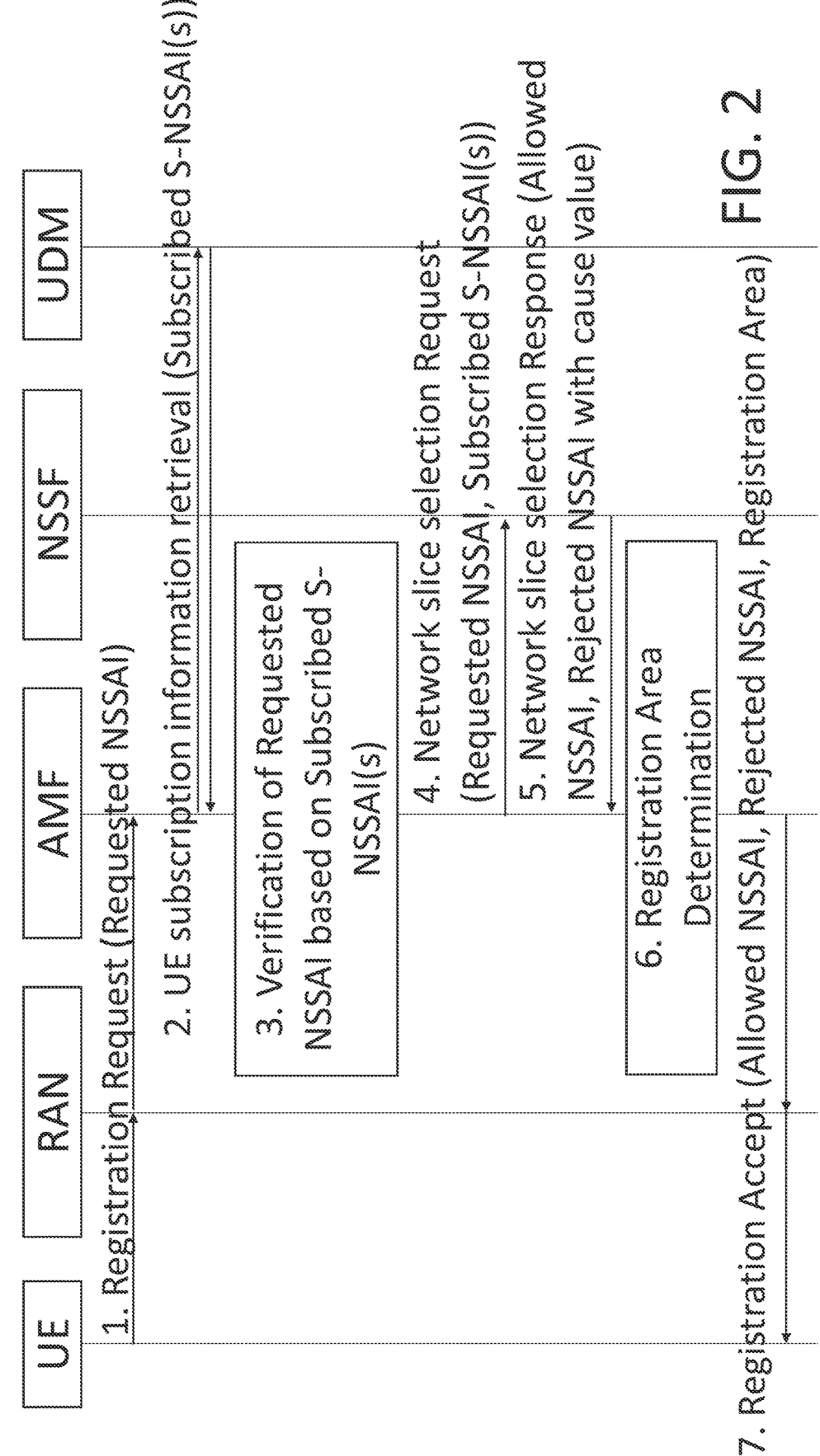
FIG. 2 shows a procedure for a UE registering for a set of network slices according to an embodiment of the present disclosure.

FIG. 2 shows a procedure for a UE registering for a set of network slices.

1. When a UE registers over an Access Type with a PLMN, the UE may provide a Requested NSSAI containing the S-NSSAI(s) corresponding to the network slice(s) which the UE requests to register for to the network in NAS layer. The Requested NSSAI may be at least one of:
   the Default Configured NSSAI, e.g., if the UE has neither Configured NSSAI nor Allowed NSSAI for the serving PLMN, in which the Configured NSSAI may be configured by the serving PLMN, and the Configured NSSAI may represent the S-NSSAI that the current serving network can provide services for users;
   the Configured-NSSAI, or a subset thereof, e.g., if the UE has no Allowed NSSAI for the Access Type for the serving PLMN;
   the Allowed-NSSAI for the Access Type over which the Requested NSSAI is sent or a subset thereof; or
   the Allowed-NSSAI for the Access Type over which the Requested NSSAI is sent or a subset thereof, and one or more S-NSSAIs from the Configured-NSSAI are not in the Allowed NSSAI for the Access Type.

2. When the AMF selected by the RAN during Registration Procedure receives the UE Registration request, the AMF may query the UDM to retrieve UE subscription information including the Subscribed S-NSSAIs.

3. The AMF verifies whether the S-NSSAI(s) in the Requested NSSAI are permitted based on the Subscribed S-NSSAIs. To identify the Subscribed S-NSSAIs, the AMF may use the mapped HPLMN S-NSSAIs provided by the UE in the NAS.

4. When the UE context in the AMF does not include an Allowed NSSAI for the corresponding Access Type, the AMF queries the NSSF for network slice selection, unless the AMF is allowed to determine whether it can serve the UE based on configuration of the AMF. The IP address or FQDN (Fully Qualified Domain Name) of the NSSF is locally configured in the AMF.

5. The NSSF returns the AMF the Allowed NSSAI. The NSSF may also return the Rejected S-NSSAI(s) with rejection cause indicating the reason why the S-NSSAI(s) is rejected, e.g., rejected NSSAI for the current PLMN, rejected NSSAI for the current Registration Area, etc.

6. The AMF may determine a Registration Area such that all S-NSSAIs in the Allowed NSSAI are available in all Tracking Areas of the Registration Area.

7. The AMF sends a Registration Accept message to the UE including the Allowed NSSAI, the mapped HPLMN NSSAI of the Allowed NSSAI (if it is provided), and the Rejected S-NSSAI(s) with rejection cause and the Registration Area.

After completion of the registration procedure, the UE may request to establish a PDU (Protocol Data Unit) Session. The Requested S-NSSAI of the PDU Session is derived from the URSP (UE route selection policy) rules or UE Local Configuration. The Requested S-NSSAI should be within the Allowed NSSAI.

For a roaming UE activating a service and/or application requiring a network slice not offered by the serving VPLMN but available in the area from other VPLMN(s), it is unclear how to re-select another VPLM. In addition, when the UE has selected a new VPLMN and camped on the new VPLMN, if the configuration of the network slice changes, e.g., the service and/or application supported by the network slice changes, it is unclear how to inform the UE to re-select another VPLMN.

Embodiments of the present disclosure provide a mechanism to ensure that HPLMN can provide the UE prioritization information of the VPLMNs and/or access technology, to allow the UE to register for the intended network slice(s).

In some embodiments of the present disclosure, the VPLMN supports several access technologies and the network slice supported by each access technology may be different. In this case, the prioritization information of VPLMNs and/or access technology may be the VPLMNs and/or access technology prioritization or VPLMNs and/or access technology combination prioritization. In other words, the UE can select the access technology and/or the VPLMN for an intended network slice based on the prioritization information of the VPLMNs and/or access technology.

In the following paragraphs, some examples are described.

Example 1: The Prioritization Information of the VPLMNs and/or Access Technology Provided by UDM/AF In this example, the prioritization information of the VPLMNs and/or access technology, which is used to allow the UE to register for the intended network slice(s), may be provided by a UDM or an AF.

Figure 3:
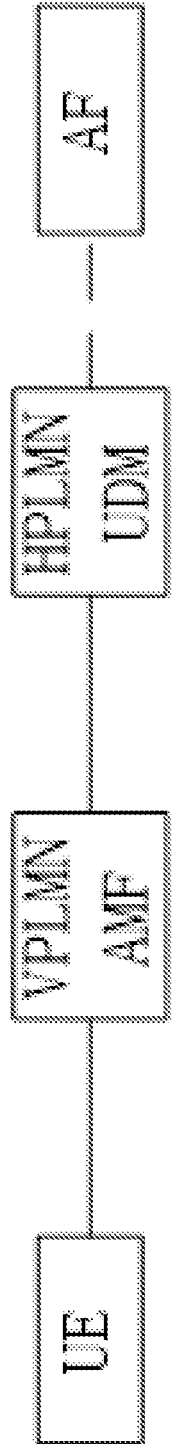
FIG. 3 shows a schematic diagram of network architecture according to an embodiment of the present disclosure.
Figure 4A:
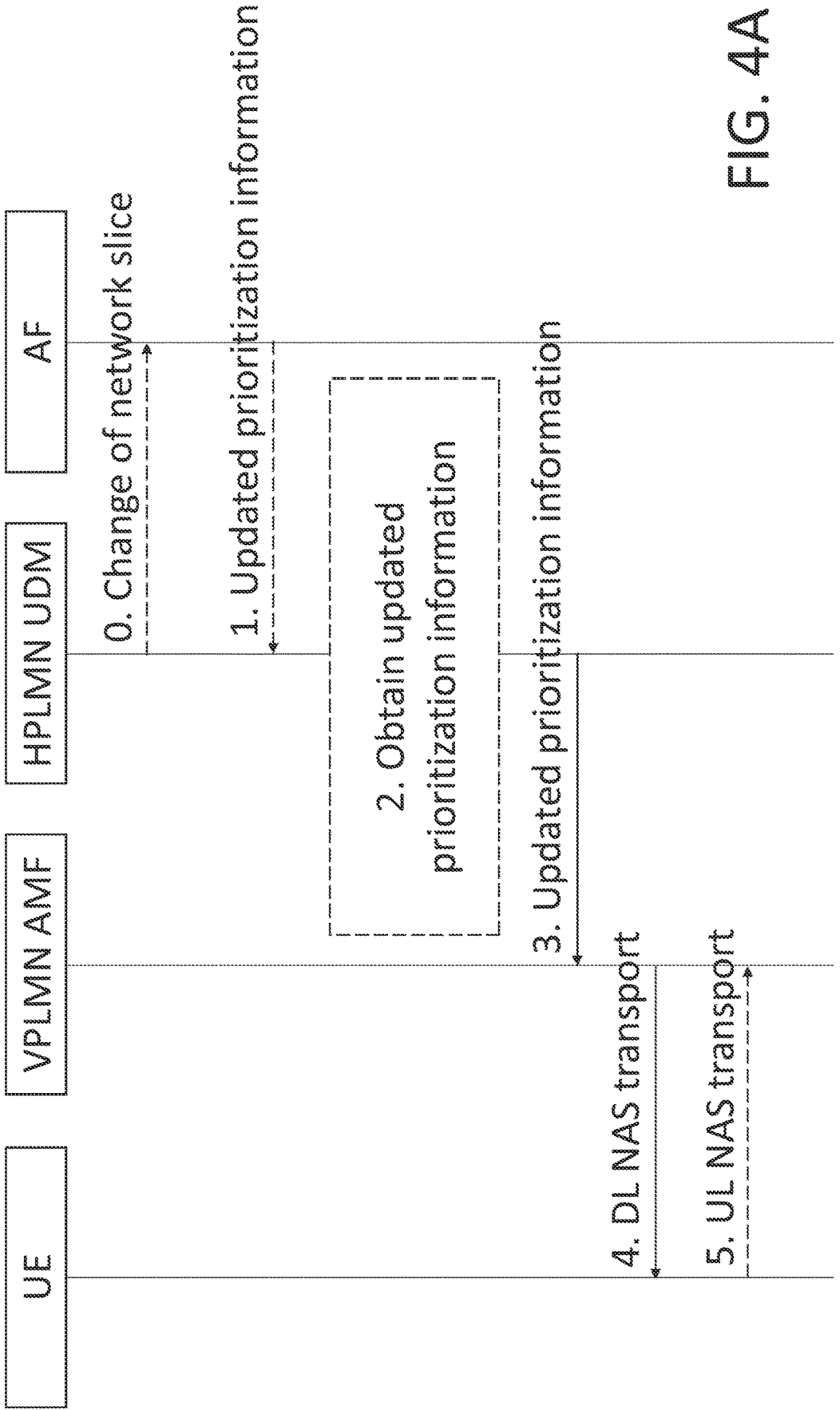
FIGS. 4A and 4B show a schematic diagram of an update procedure according to an embodiment of the present disclosure.
Figure 4B:
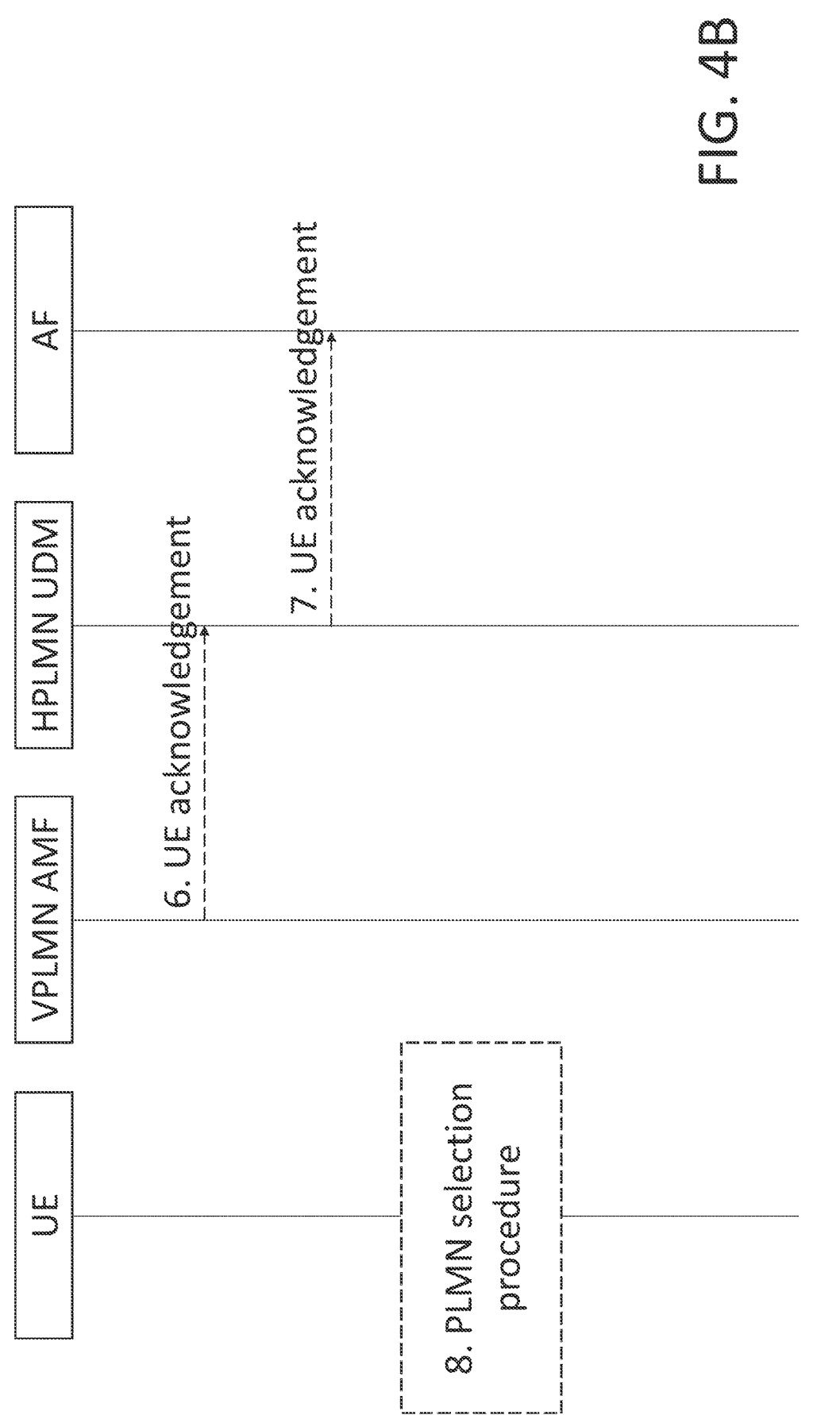

FIG. 3 shows a schematic diagram of the architecture for this example and FIG. 4 shows the update procedure.

In this example, the AF is an NF which may be deployed in the HPLMN and used for VPLMN prioritization management. The AF is deployed optionally for operators. If the AF is not deployed, the VPLMN prioritization information may be managed by the UDM and/or UDR (Unified Data Repository).

In this example, the AF may be an enhanced SoR-AF configured for the VPLMN prioritization management based on slice information or a new NF to perform the VPLMN prioritization management based on slice information.

0. If a subscribed network slice subscribed by the UE changes (e.g., the service and/or the application supported by the network slice changes) and the prioritization information of the VPLMNs and/or access technology the UE used to register for the network slice(s) is generated by the AF, the UDM informs the AF about the changes of the subscribed network slice (e.g., provide the updated subscribed S-NSSAI to the AF).

1. If the information of VPLMNs and/or access technology and network slice(s) supported by each VPLMN is stored in the AF and the configuration of the network slice changes, the AF provides an updated prioritization information of the VPLMNs and/or access technology with which the UE may register (e.g., perform PLMN selection) for the network slice(s) to the UDM.

In an embodiment, the UDM may obtain the prioritization information of the VPLMNs and/or access technology from the AF during the registration procedure. Then, the UDM can subscribe a notification of updates of the prioritization information.

2. Alternatively, if the information of VPLMNs and/or access technology and network slice(s) supported by each VPLMN is stored in the UDR, and the configuration of the network slice changes, the UDM obtains the updated prioritization information of the VPLMNs and/or access technology from the UDR.

3. The HPLMN UDM sends a notification (e.g., via the Nudm_SDM_notification service operation) to the VPLMN AMF, in which the notification includes the updated prioritization information of the VPLMNs and/or access technology.

In an embodiment, during the registration, the AMF may provide the intended S-NSSAIs associated to network slices which the UE intends to register for to the UDM to obtain the prioritization information of the VPLMNs and/or access technology. Then, the AMF may subscribe a notification of updates of the prioritization information of the VPLMNs and/or access technology.

4. The AMF sends the updated prioritization information to the UE in, for example, a DL (downlink) NAS transport message. In an embodiment, the updated prioritization information may be transparent for the AMF. That is, the AMF sends the updated prioritization information to the UE without knowing the content of the information.

In an alternative embodiment, the prioritization information of the VPLMNs and/or access technology may not be transparent to the AMF. In this case, the VPLMN AMF acknowledges and stores the received prioritization information and sends the received prioritization information of the VPLMNs and/or access technology to the UE in, for example, the DL NAS transport message or UE configuration update message.

5. If the UDM requests an acknowledgement from the UE for the updated prioritization information and the UE verified that the updated prioritization information of the VPLMNs and/or access technology from the HPLMN is received, the UE sends an update acknowledge message (e.g., via the UL NAS transport or UE configuration update ack message) to the serving AMF with the UE acknowledgement.

6. If the update acknowledge message in step 5 is received, the AMF will provide the received UE acknowledgement to the UDM (e.g., by using the Nudm_SDM_Info service operation).

7. The HPLMN UDM may inform the AF about the successful delivery of the updated prioritization information of the VPLMNs and/or access technology.

8. If the UE activates a service and/or an application requiring a network slice not offered by the serving VPLMN but available in the area from other VPLMNs based on the received prioritization information of the VPLMNs and/or access technology, and the UE is in an automatic network selection mode, the UE may attempt to obtain a service in a higher priority PLMN with which the UE can register for the network slice.

Example 2: The Prioritization Information of the VPLMNs and/or Access Technology Provided by an NF In this example, the prioritization information of the VPLMNs and/or access technology, which is used to allow the UE to register for the intended network slice(s), may be provided by a newly defined NF or a self-defined NF. The NF, for example, is deployed in an HPLMN and used for VPLMN prioritization management based on the slice information.

Figure 5:
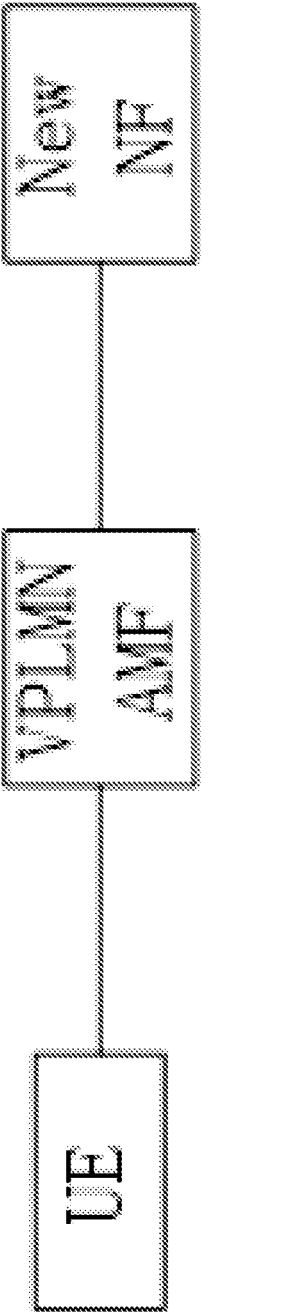
FIG. 5 shows a schematic diagram of network architecture according to an embodiment of the present disclosure.
Figure 6A:
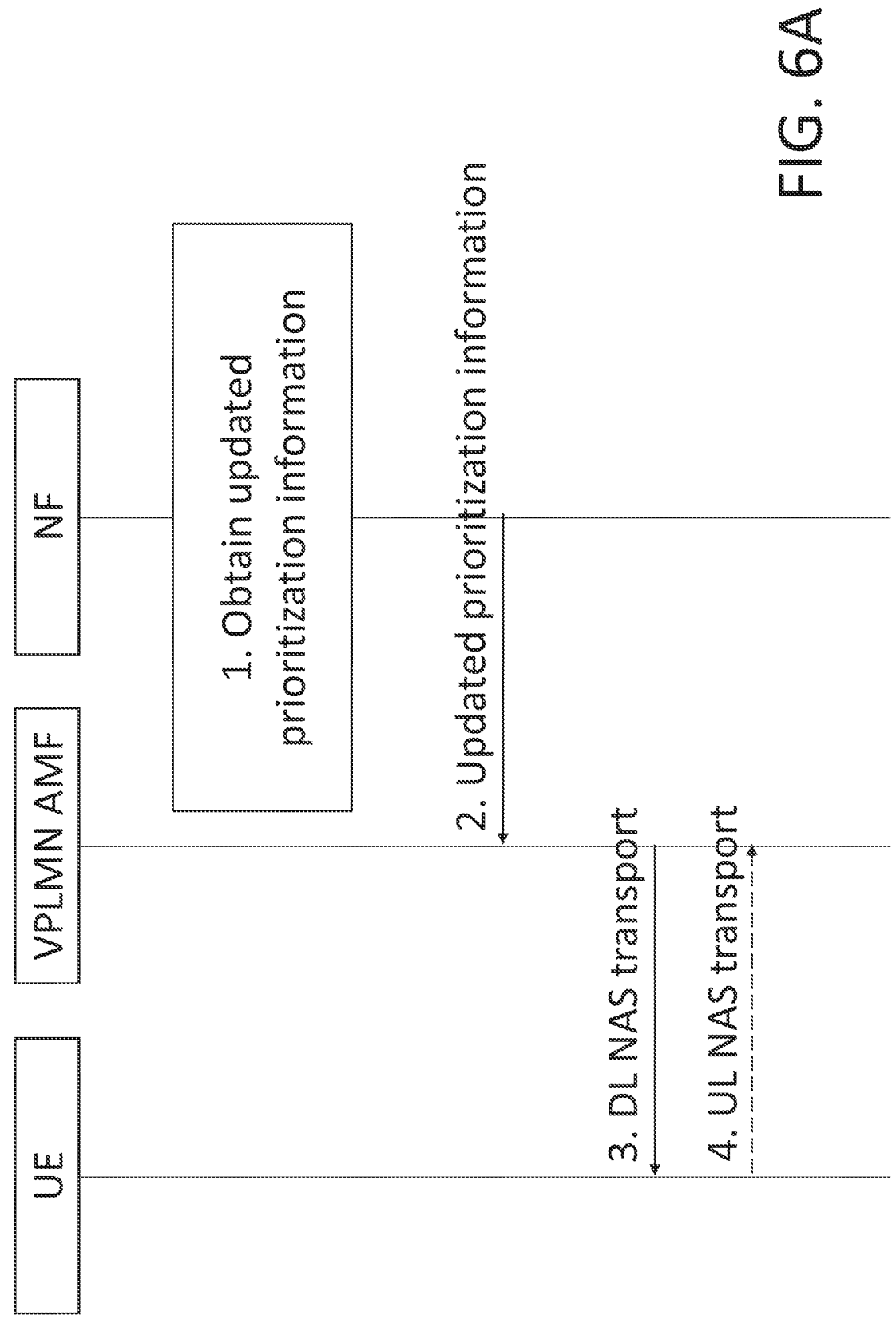
FIGS. 6A and 6B show a schematic diagram of an update procedure according to an embodiment of the present disclosure.
Figure 6B:
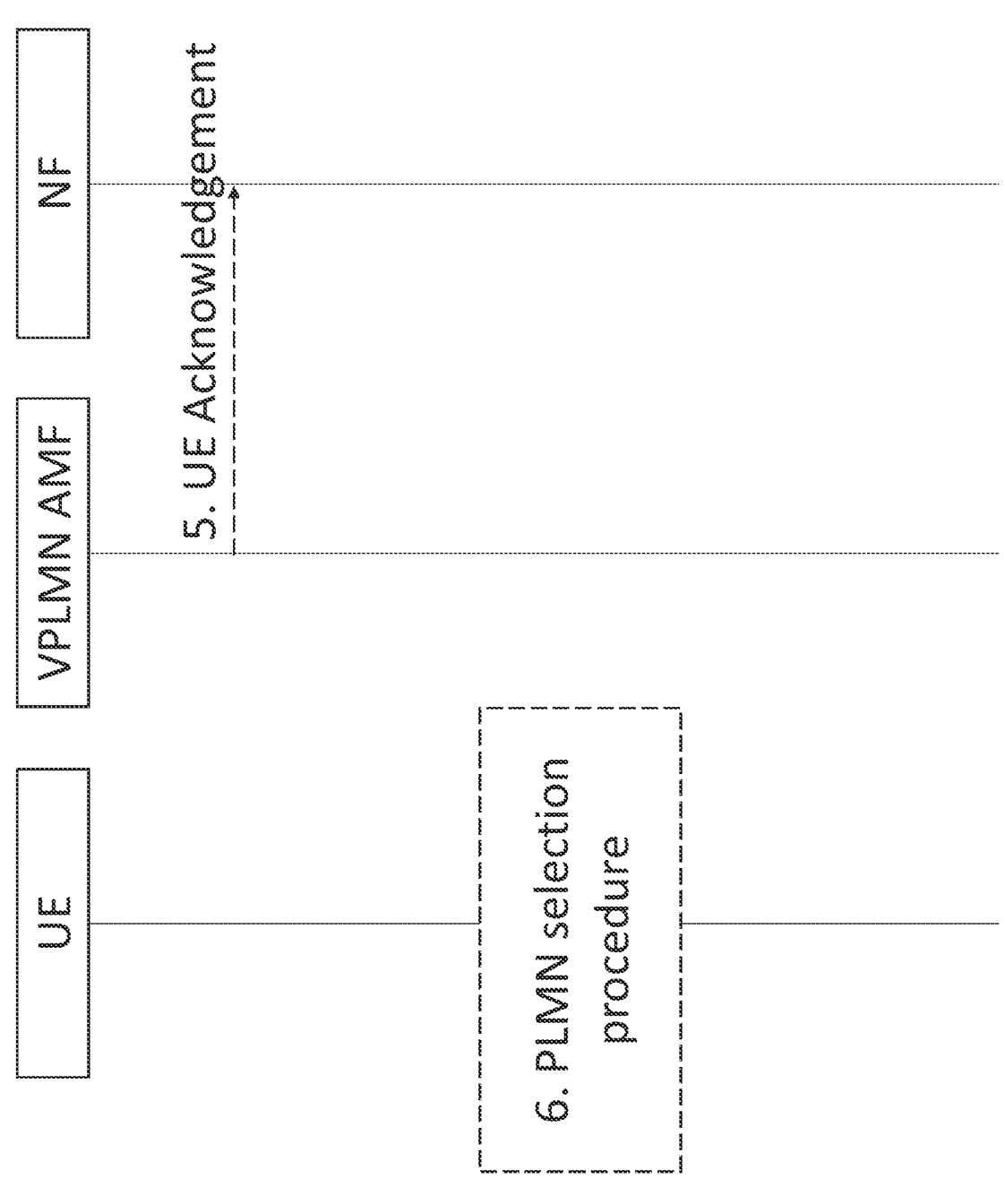

FIG. 5 shows a schematic diagram of the architecture for this example and FIG. 6 shows the update procedure.

1. If the information of VPLMNs and/or access technology and network slice(s) supported by each VPLMN is stored in the NF, and the configuration of the network slice changes (e.g., the service and/or the application supported by the network slice changes), the NF updates the prioritization information of the VPLMNs and/or access technology the UE used to register for the network slice(s).

In an embodiment, during the registration, the AMF may provide the intended S-NSSAIs associated to network slices which the UE intends to register for to the NF to obtain the prioritization information of the VPLMNs and/or access technology. Then, the AMF may subscribe a notification of updates of the prioritization information of the VPLMNs and/or access technology.

2. The NF sends the updated prioritization information of the VPLMNs and/or access technology to the VPLMN AMF In an embodiment, during the registration, the AMF may provide the intended S-NSSAIs associated to network slices which the UE intends to register for to the NF to obtain the prioritization information of the VPLMNs and/or access technology. Then, the AMF may subscribe a notification of updates of the prioritization information of the VPLMNs and/or access technology.

3. The AMF sends the updated prioritization information to the UE in, for example, a DL (downlink) NAS transport message. In an embodiment, the updated prioritization information may be transparent for the AMF. That is, the AMF sends the updated prioritization information to the UE without knowing the content of the information.

In an alternative embodiment, the prioritization information of the VPLMNs and/or access technology may not be transparent to the AMF. In this case, the VPLMN AMF acknowledges and stores the updated prioritization information and sends the received prioritization information of the VPLMNs and/or access technology to the UE in, for example, the DL NAS transport message or UE configuration update message.

4. If the NF requests an acknowledgement from the UE for the updated prioritization information and the UE verified that the updated prioritization information of the VPLMNs and/or access technology from the HPLMN is received, the UE sends an update acknowledge message (e.g., via the UL NAS transport or UE configuration update ack message) to the serving AMF with the UE acknowledgement.

5. If the update acknowledge message in step 4 is received, the AMF will provide the received UE acknowledgement to the NF.

6. If the UE activates a service and/or an application requiring a network slice not offered by the serving VPLMN but available in the area from other VPLMNs based on the received prioritization information of the VPLMNs and/or access technology, and the UE is in an automatic network selection mode, the UE may attempt to obtain a service in a higher priority PLMN with which the UE can register for the network slice.

Example 3: The Prioritization Information of the VPLMNs and/or Access Technology Provided by an NSSF In this example, the prioritization information of the VPLMNs and/or access technology, which is used to allow the UE to register for the intended network slice(s), may be provided by an NSSF.

In some situations (e.g., in case of home-routed roaming), HPLMN and VPLMN may deploy NSSFs separately, and which are hNSSF (home network slice Selection Function) and vNSSF (visitor network slice Selection Function).

Figure 7:
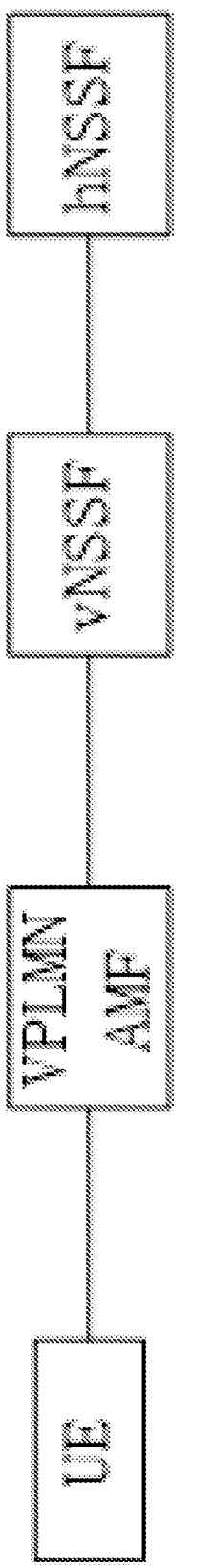
FIG. 7 shows a schematic diagram of network architecture according to an embodiment of the present disclosure.
Figure 8A:
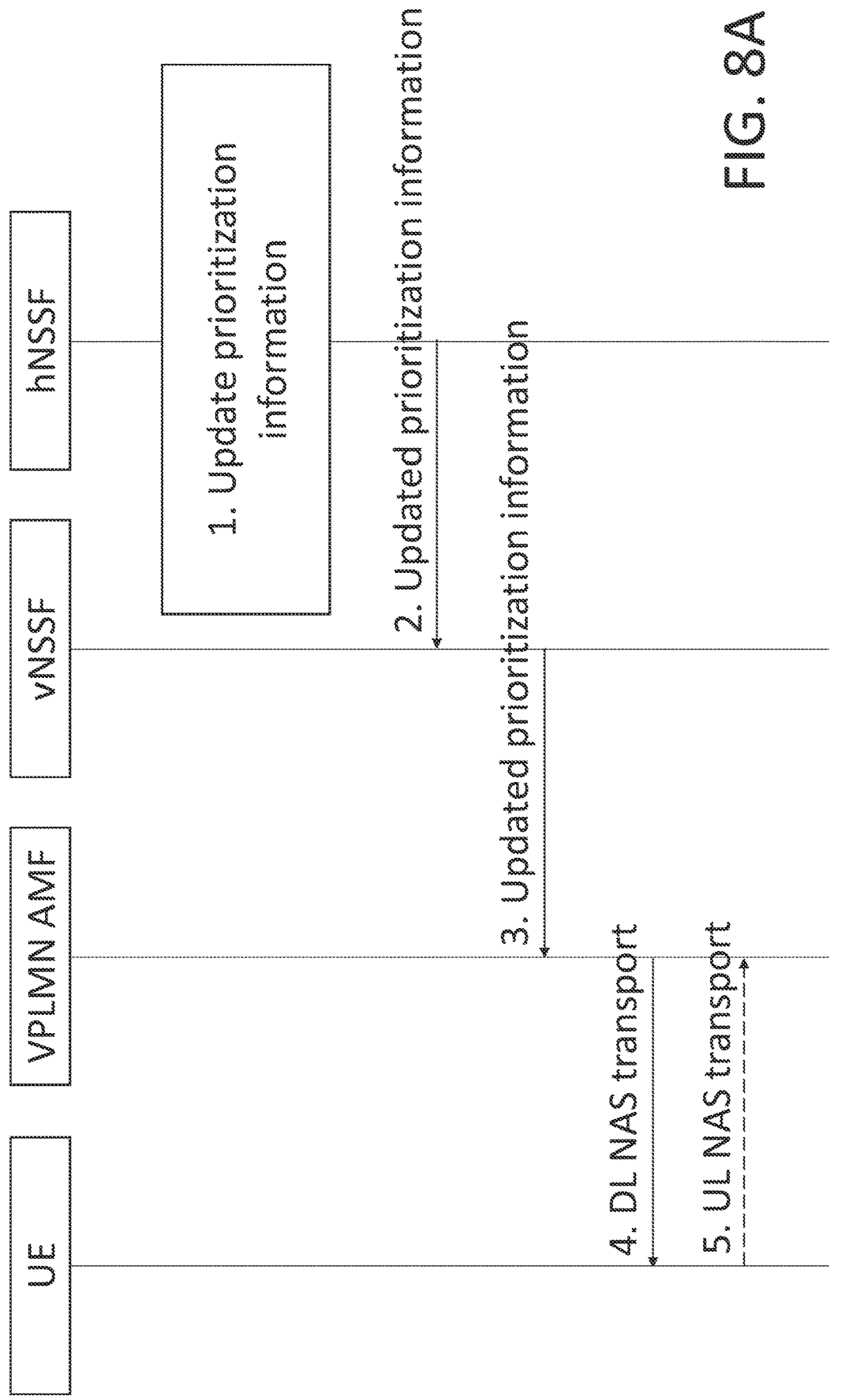
FIGS. 8A and 8B show a schematic diagram of an update procedure according to an embodiment of the present disclosure.
Figure 8B:
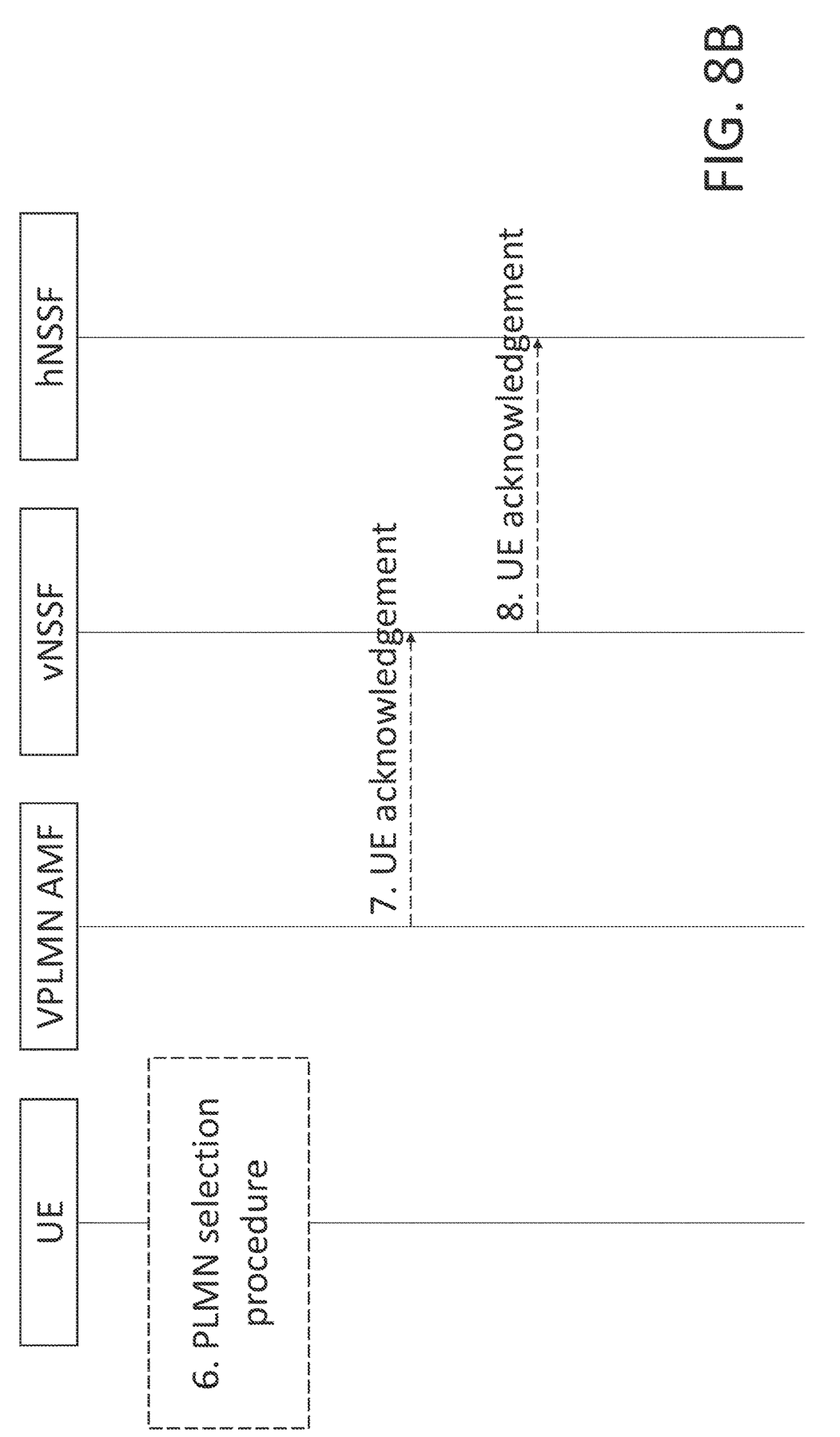

FIG. 7 shows a schematic diagram of the architecture for this example and FIG. 8 shows the update procedure.

1. If the information of VPLMNs and/or access technology and network slice(s) supported by each VPLMN is stored in the hNSSF, and the configuration of the network slice changes (e.g., the service and/or the application supported by the network slice changes), the hNSSF updates the prioritization information of the VPLMNs and/or access technology the UE used to register for the network slice(s).

In an embodiment, during the registration, the AMF may provide the intended S-NSSAIs associated to network slices which the UE intends to register for to the hNSSF to obtain the prioritization information of the VPLMNs and/or access technology. Then, both the vNSSF and the AMF may subscribe a notification of updates of the prioritization information of the VPLMNs and/or access technology.

2. The vNSSF sends the updated prioritization information of the VPLMNs and/or access technology to the VPLMN AMF.

In an embodiment, during the registration, the AMF may provide the intended S-NSSAIs associated to network slices which the UE intends to register for to the vNSSF to obtain the prioritization information of the VPLMNs and/or access technology. Then, the AMF may subscribe a notification of updates of the prioritization information of the VPLMNs and/or access technology from the vNSSF. The vNSSF may subscribe the notification of updates of the prioritization information of the VPLMNs and/or access technology from the hNSSF.

3. The vNSSF sends a notification to the VPLMN AMF, in which the notification includes the updated prioritization information of the VPLMNs and/or access technology.

4. The AMF sends the updated prioritization information to the UE in, for example, a DL (downlink) NAS transport message. In an embodiment, the updated prioritization information may be transparent for the AMF. That is, the AMF sends the updated prioritization information to the UE without knowing the content of the information.

In an alternative embodiment, the prioritization information of the VPLMNs and/or access technology may not be transparent to the AMF. In this case, the VPLMN AMF acknowledges and stores the updated prioritization information and sends the received prioritization information of the VPLMNs and/or access technology to the UE in, for example, the DL NAS transport message or UE configuration update message.

5. If the hNSSF or the vNSSF requests an acknowledgement from the UE for the updated prioritization information and the UE verified that the updated prioritization information of the VPLMNs and/or access technology from the HPLMN is received, the UE sends an update acknowledge message (e.g., via the UL NAS transport or UE configuration update ack message) to the serving AMF with the UE acknowledgement.

6. If the UE activates a service and/or an application requiring a network slice not offered by the serving VPLMN but available in the area from other VPLMNs based on the received prioritization information of the VPLMNs and/or access technology, and the UE is in an automatic network selection mode, the UE may attempt to obtain a service in a higher priority PLMN with which the UE can register for the network slice.

7. If the update acknowledge message in step 5 is received, the AMF will provide the received UE acknowledgement to the vNSSF.

8. If the update acknowledge message in step 5 is received, the vNSSF provides the received UE acknowledgement to the hNSSF.

Example 4: The Prioritization Information of the VPLMNs and/or Access Technology Provided by a PCF In this example, the prioritization information of the VPLMNs and/or access technology, which is used to allow the UE to register for the intended network slice(s), may be provided by the PCF in the HPLMN. The PCF in the HPLMN (also referred to as hPCF) manages the prioritization information of the VPLMNs and/or access technology and network slice(s) supported by each VPLMN.

In this example, the PCF in the VPLMN is also deployed (referred to as vPCF).

Figure 9:
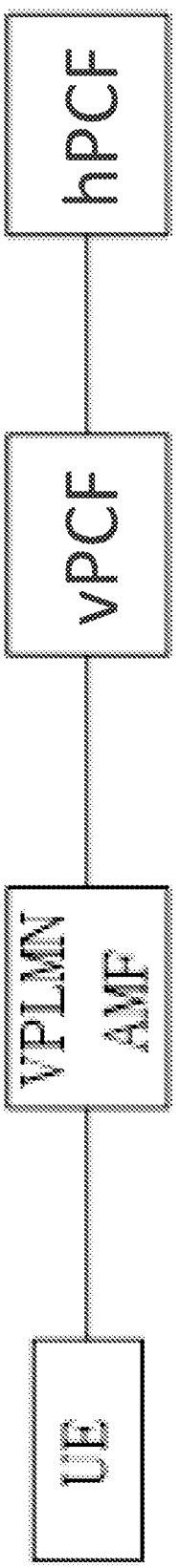
FIG. 9 shows a schematic diagram of network architecture according to an embodiment of the present disclosure.
Figure 10A:
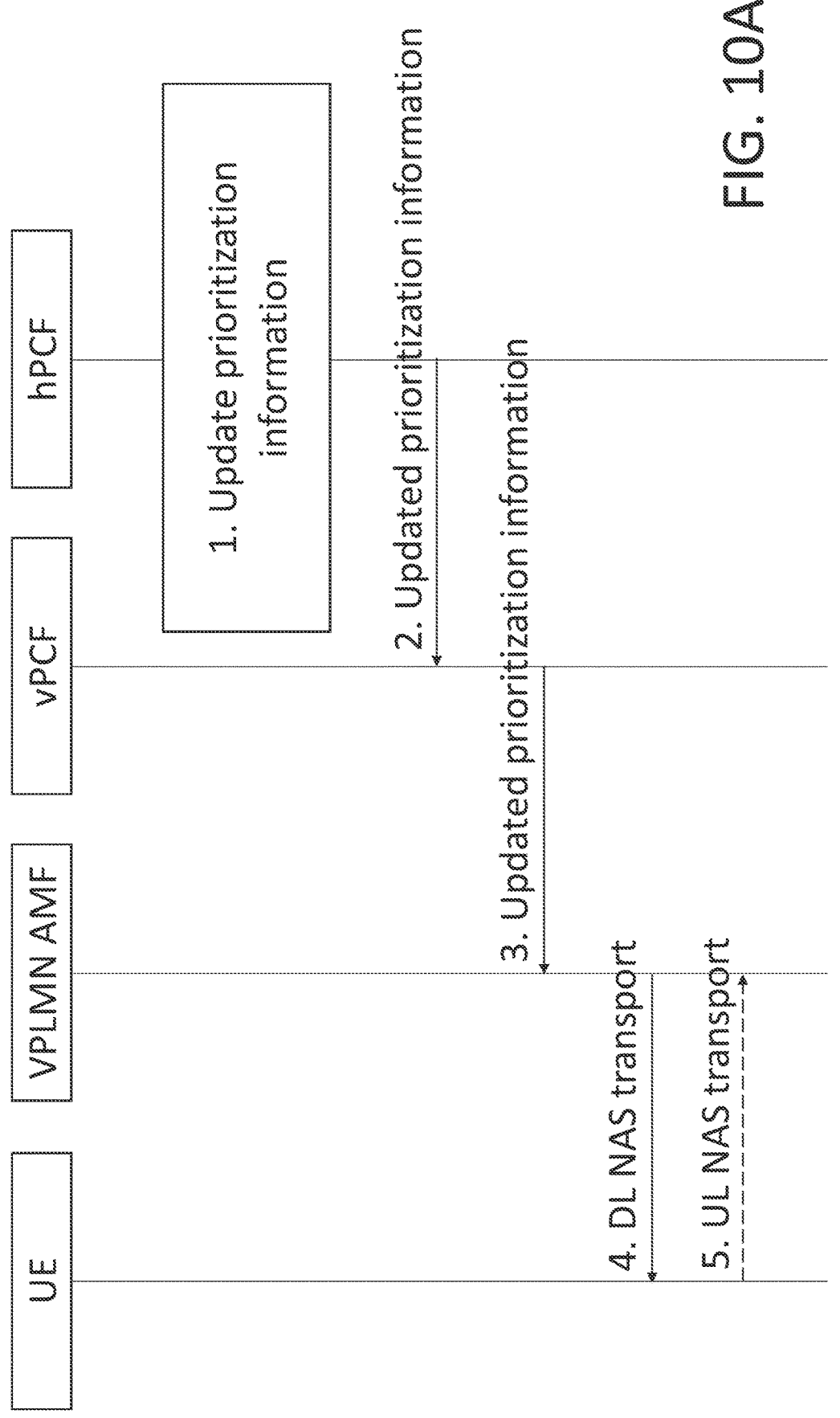
Figure 10B:
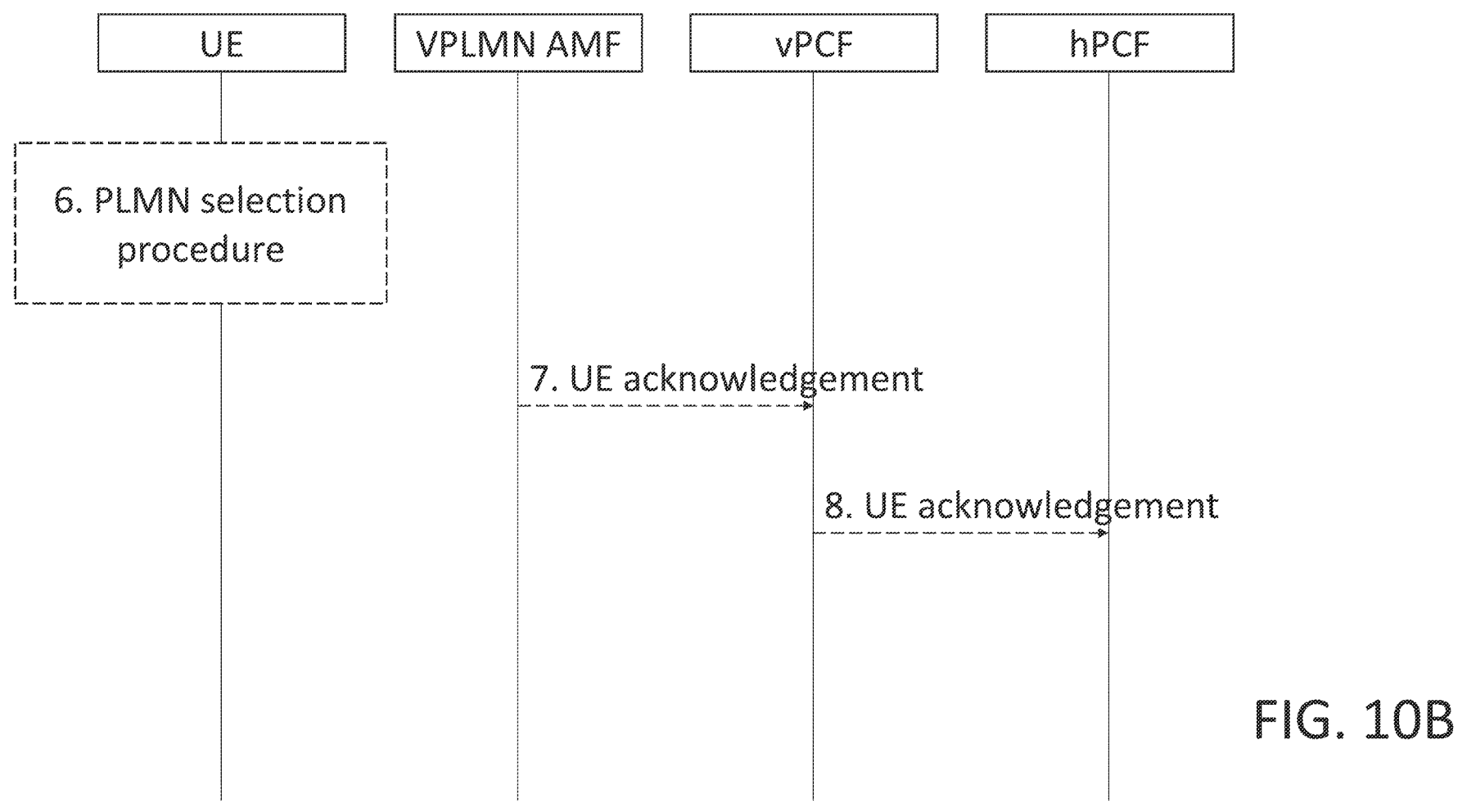

FIG. 9 shows a schematic diagram of the architecture for this example and FIG. 10 shows the update procedure.

1. If the information of VPLMNs and/or access technology and network slice(s) supported by each VPLMN is stored in the hPCF, and the configuration of the network slice changes (e.g., the service and/or the application supported by the network slice changes), the hPCF updates the prioritization information of the VPLMNs and/or access technology the UE used to register for the network slice(s).

In an embodiment, during the registration, the AMF may provide the intended S-NSSAIs associated to network slices which the UE intends to register for to the hPCF to obtain the prioritization information of the VPLMNs and/or access technology. Then, both the vPCF and the AMF may subscribe a notification of updates of the prioritization information of the VPLMNs and/or access technology.

2. The vPCF sends the updated prioritization information of the VPLMNs and/or access technology to the VPLMN AMF.

In an embodiment, during the registration, the AMF may provide the intended S-NSSAIs associated to network slices which the UE intends to register for to the vPCF to obtain the prioritization information of the VPLMNs and/or access technology. Then, the AMF may subscribe a notification of updates of the prioritization information of the VPLMNs and/or access technology from the vPCF. The vPCF may subscribe the notification of updates of the prioritization information of the VPLMNs and/or access technology from the hPCF.

3. The vPCF sends a notification to the VPLMN AMF, in which the notification includes the updated prioritization information of the VPLMNs and/or access technology.

4. The AMF sends the updated prioritization information to the UE in, for example, a DL (downlink) NAS transport message. In an embodiment, the updated prioritization information may be transparent for the AMF. That is, the AMF sends the updated prioritization information to the UE without knowing the content of the information.

In an alternative embodiment, the prioritization information of the VPLMNs and/or access technology may not be transparent to the AMF. In this case, the VPLMN AMF acknowledges and stores the updated prioritization information and sends the received prioritization information of the VPLMNs and/or access technology to the UE in, for example, the DL NAS transport message or UE configuration update message.

5. If the hPCF or the vPCF requests an acknowledgement from the UE for the updated prioritization information and the UE verified that the updated prioritization information of the VPLMNs and/or access technology from the HPLMN is received, the UE sends an update acknowledge message (e.g., via the UL NAS transport or UE configuration update ack message) to the serving AMF with the UE acknowledgement.

6. If the UE activates a service and/or an application requiring a network slice not offered by the serving VPLMN but available in the area from other VPLMNs based on the received prioritization information of the VPLMNs and/or access technology, and the UE is in an automatic network selection mode, the UE may attempt to obtain a service in a higher priority PLMN with which the UE can register for the network slice.

7. If the update acknowledge message in step 5 is received, the AMF will provide the received UE acknowledgement to the vPCF.

8. If the update acknowledge message in step 5 is received, the vPCF provides the received UE acknowledgement to the hPCF.

According to an embodiment of the present disclosure, the UE receives the updated prioritization information of the VPLMNs and/or access technology with which the UE may register for the intended network slice(s) from the AMF.

According to an embodiment of the present disclosure, the UE performs the PLMN selection based on the updated prioritization information.

According to an embodiment of the present disclosure, if the acknowledgement is required, the UE sends the acknowledgment to the UDM, the NF, the vNSSF, the hNSSF, the vPCF, or the hPCF via the AMF.

According to an embodiment of the present disclosure, the AMF receives the updated prioritization information of the VPLMNs and/or access technology with which the UE may register for the intended network slice(s) from the UDM, the NF, the vNSSF, the hNSSF, the vPCF, or the hPCF.

According to an embodiment of the present disclosure, the AMF sends the prioritization information of the VPLMNs and/or access technology to the UE.

According to an embodiment of the present disclosure, the UDM, the NF, the vNSSF, the hNSSF, the vPCF, or the hPCF provides the updated prioritization information of the VPLMNs and/or access technology to the AMF or the UE.

Figure 11:
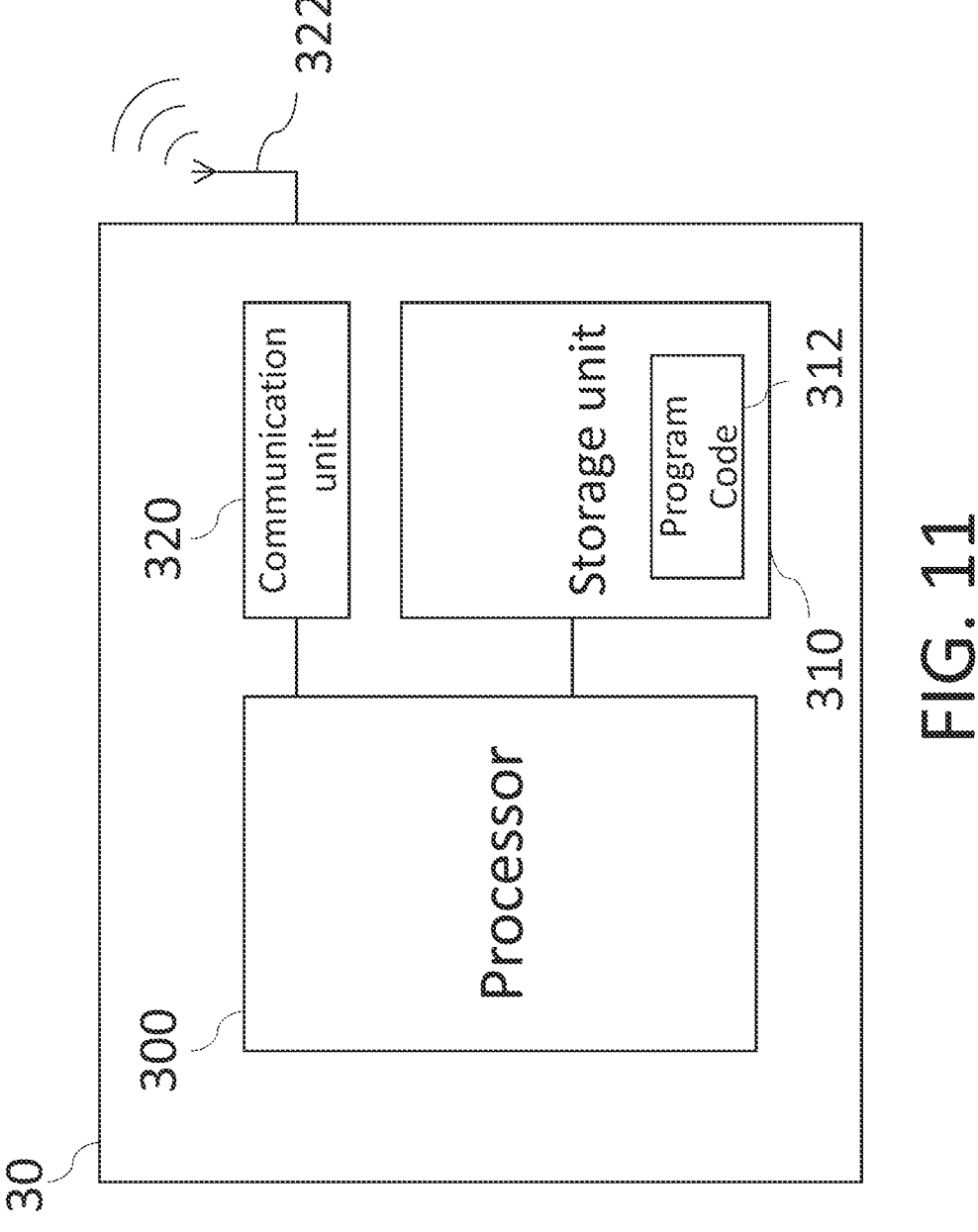
FIG. 11 shows an example of a schematic diagram of a wireless communication terminal according to an embodiment of the present disclosure.

FIG. 11 relates to a schematic diagram of a wireless communication terminal 30 (e.g., a terminal node or a terminal device) according to an embodiment of the present disclosure. The wireless communication terminal 30 may be a user equipment (UE), a mobile phone, a laptop, a tablet computer, an electronic book or a portable computer system and is not limited herein. The wireless communication terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage code 312 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g., messages or packets) according to processing results of the processor 300. In an embodiment, the communication unit 320 transmits and receives the signals via at least one antenna 322.

In an embodiment, the storage unit 310 and the program code 312 may be omitted and the processor 300 may include a storage unit with stored program code.

The processor 300 may implement any one of the steps in exemplified embodiments on the wireless communication terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless communication node.

In some embodiments, the wireless communication terminal 30 may be used to perform the operations of the UE described above. In some embodiments, the processor 300 and the communication unit 320 collaboratively perform the operations described above. For example, the processor 300 performs operations and transmit or receive signals, message, and/or information through the communication unit 320.

Figure 12:
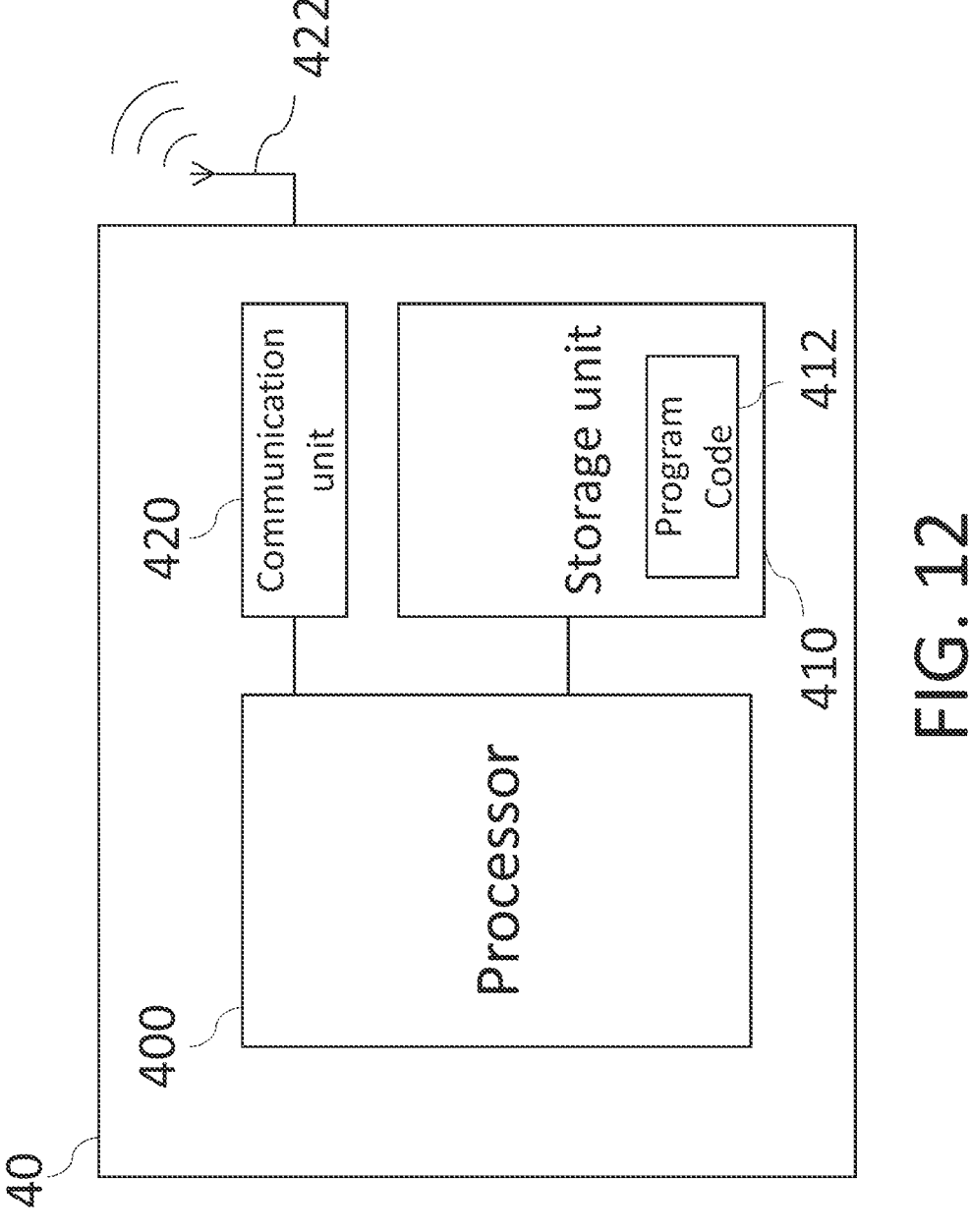
FIG. 12 shows an example of a schematic diagram of a wireless communication node according to an embodiment of the present disclosure.

FIG. 12 relates to a schematic diagram of a wireless communication node 40 (e.g., a network device) according to an embodiment of the present disclosure. The wireless communication node 40 may be a satellite, a base station (BS) (e.g., a gNB or a gNB-CU-CP), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless communication node 40 may include (perform) at least one network function such as an access and mobility management function (AMF), a session management function (SMF), a user place function (UPF), a policy control function (PCF), an application function (AF), an Unified Data Management (UDM), a network slice Selection Function (NSSF) etc. The wireless communication node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g., messages or packets) according to processing results of the processor 400. In an example, the communication unit 420 transmits and receives the signals via at least one antenna 422.

In an embodiment, the storage unit 410 and the program code 412 may be omitted. The processor 400 may include a storage unit with stored program code.

The processor 400 may implement any steps described in exemplified embodiments on the wireless communication node 40, e.g., via executing the program code 412.

The communication unit 420 may be a transceiver. The communication unit 420 may as an alternative or in addition be combining a transmitting unit and a receiving unit configured to transmit and to receive, respectively, signals, messages, or information to and from a wireless communication node and/or a wireless communication terminal.

In some embodiments, the wireless communication node 40 may be used to perform the operations of the AMF, the UDM, the AF, the newly defined NF, the hNSSF, the vNSSF, the hPCF, and the vPCF described above. In some embodiments, the processor 400 and the communication unit 420 collaboratively perform the operations described above. For example, the processor 400 performs operations and transmit or receive signals through the communication unit 420.

A wireless communication method is also provided according to an embodiment of the present disclosure. In an embodiment, the wireless communication method may be performed by using a wireless communication terminal (e.g., a UE). In an embodiment, the wireless communication terminal may be implemented by using the wireless communication terminal 30 described above, but is not limited thereto.

Figure 13:
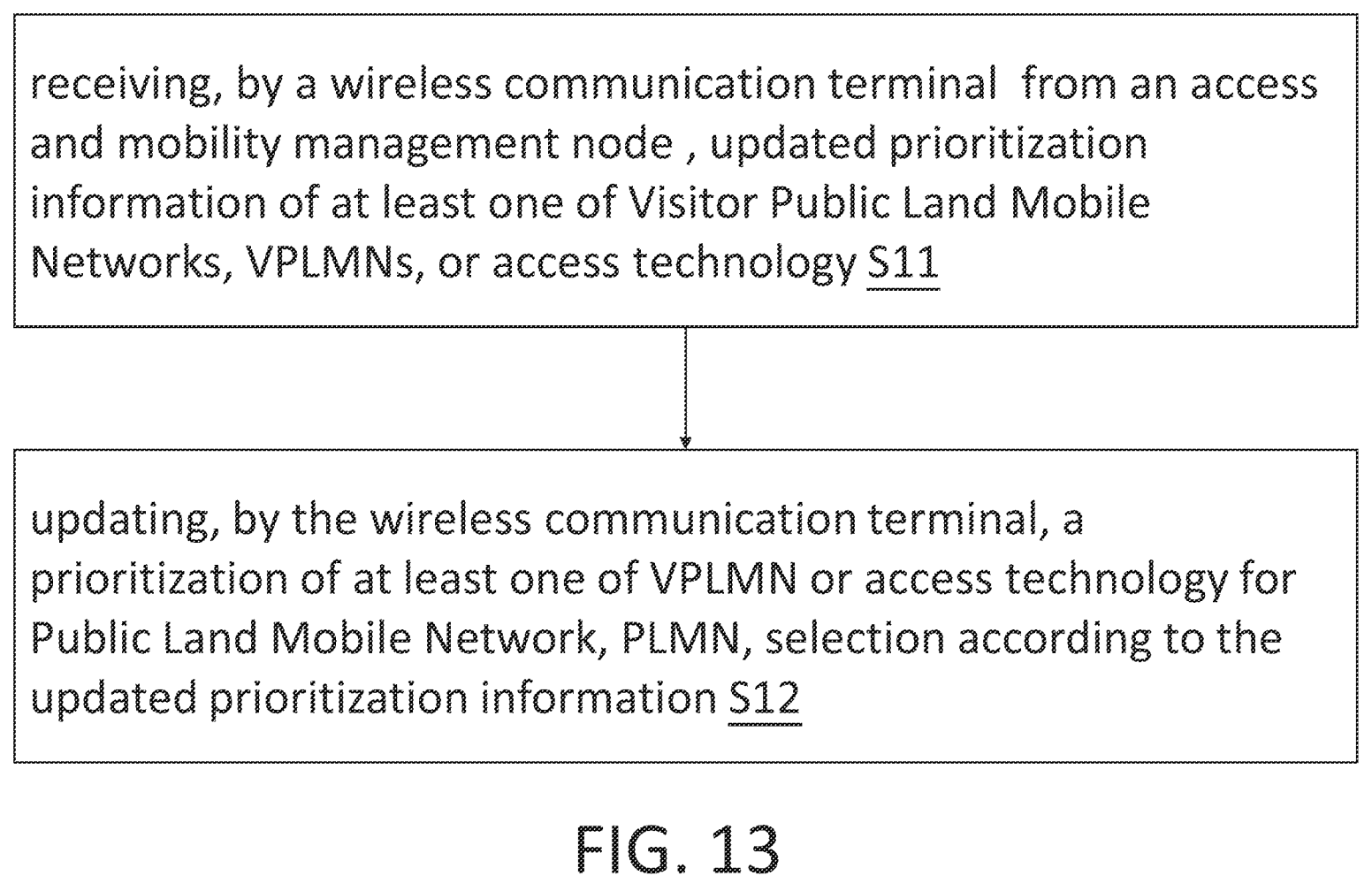

Referring to FIG. 13, in an embodiment, the wireless communication method includes: receiving, by a wireless communication terminal from an access and mobility management node, updated prioritization information of at least one of Visitor Public Land Mobile Networks, VPLMNs, or access technology (S11); and updating, by the wireless communication terminal, a prioritization of at least one of VPLMN or access technology for Public Land Mobile Network, PLMN, selection according to the updated prioritization information (S12).

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., an AMF). In an embodiment, the wireless communication node may be implemented by using the wireless communication node 40 described above, but is not limited thereto.

Figure 14:
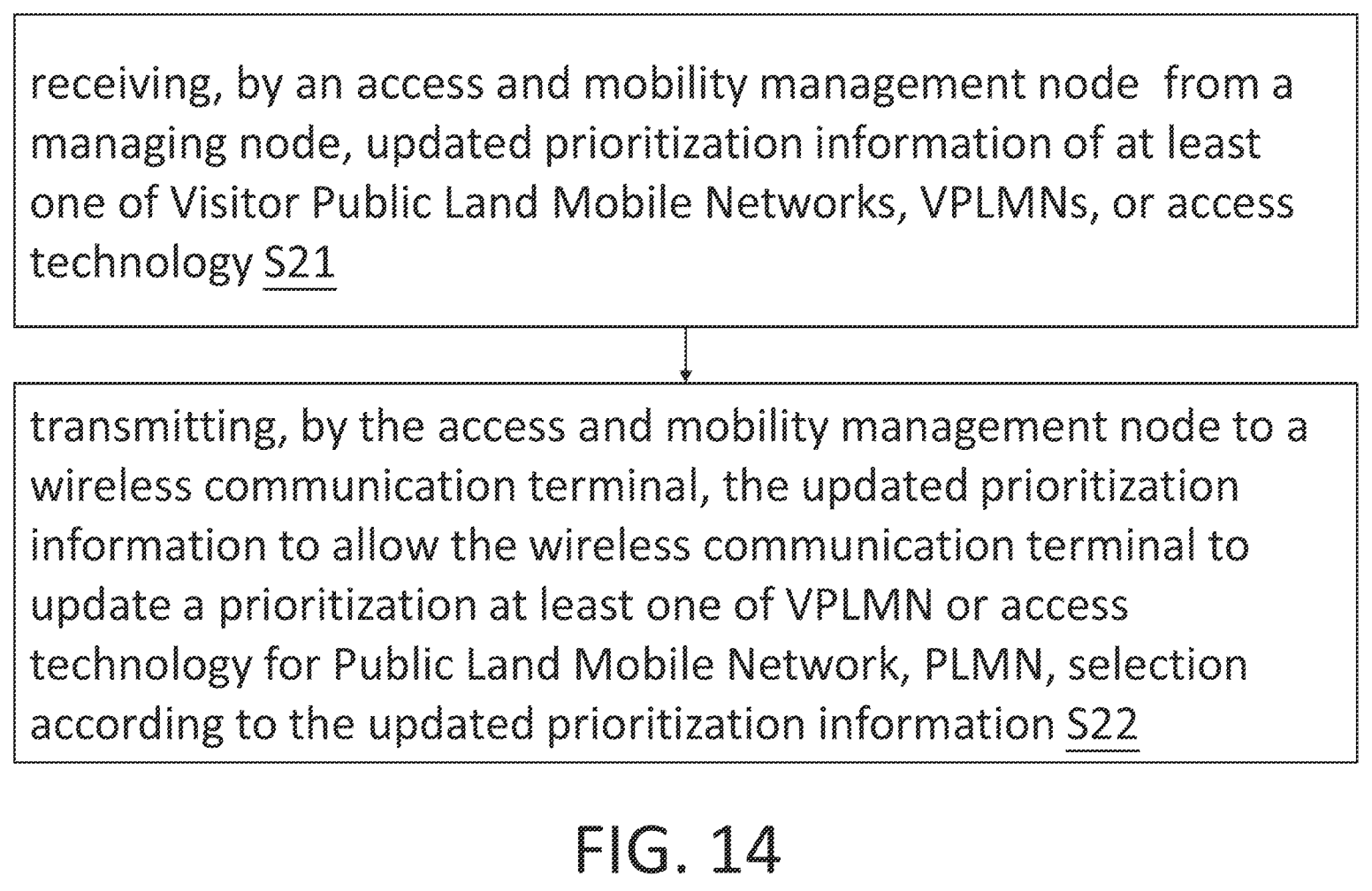

Referring to FIG. 14, in an embodiment, the wireless communication method includes: receiving, by an access and mobility management node from a managing node, updated prioritization information of at least one of Visitor Public Land Mobile Networks, VPLMNs, or access technology (S21); and transmitting, by the access and mobility management node to a wireless communication terminal, the updated prioritization information to allow the wireless communication terminal to update a prioritization at least one of VPLMN or access technology for Public Land Mobile Network, PLMN, selection according to the updated prioritization information (S22).

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., an UDM). In an embodiment, the wireless communication node may be implemented by using the wireless communication node 40 described above, but is not limited thereto.

Figure 15:
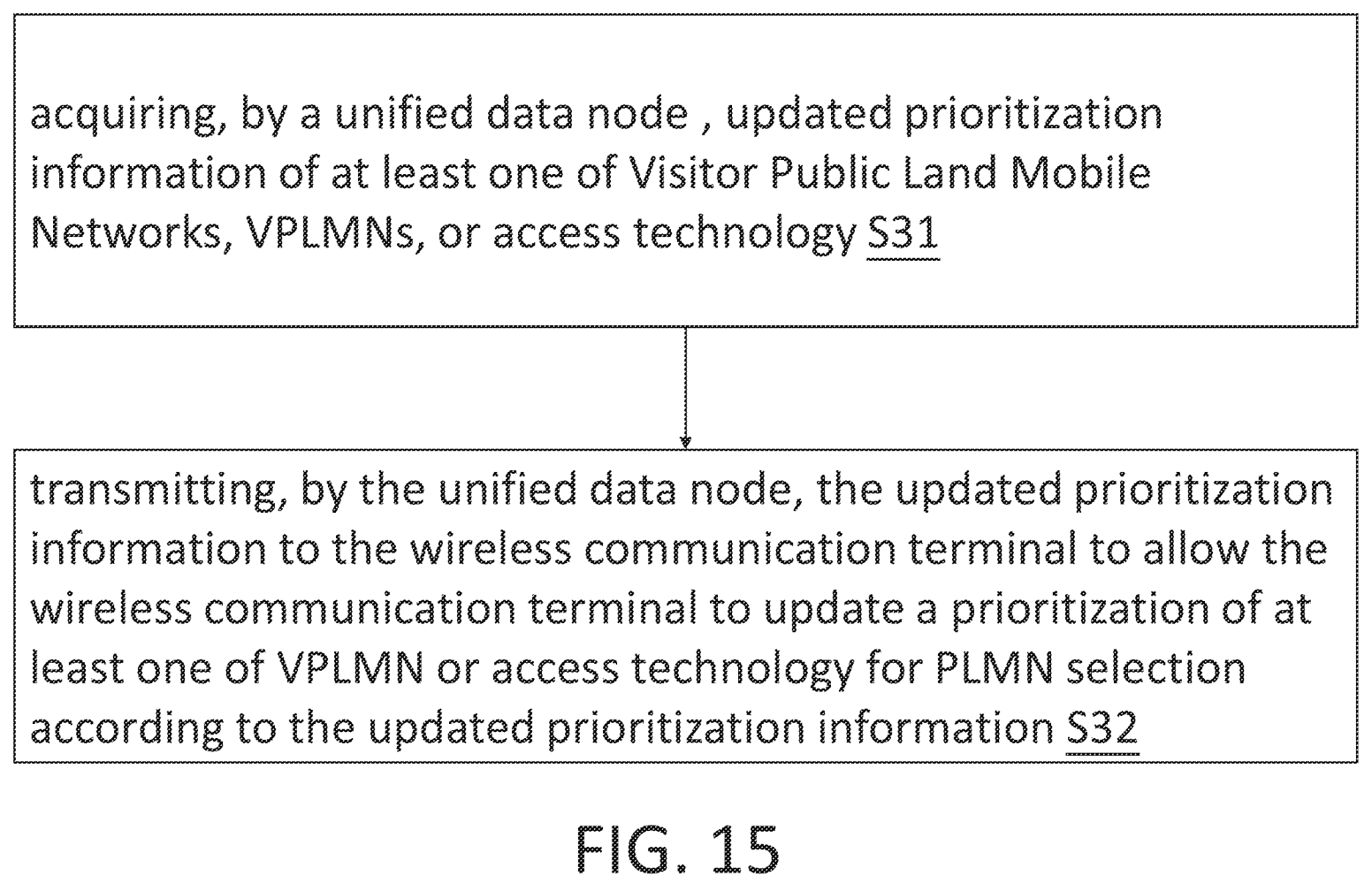

Referring to FIG. 15, in an embodiment, the wireless communication method includes: acquiring, by a unified data node, updated prioritization information of at least one of Visitor Public Land Mobile Networks, VPLMNs, or access technology (S31); and transmitting, by the unified data node, the updated prioritization information to the wireless communication terminal to allow the wireless communication terminal to update a prioritization of at least one of VPLMN or access technology for PLMN selection according to the updated prioritization information (S32).

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., an NF). In an embodiment, the wireless communication node may be implemented by using the wireless communication node 40 described above, but is not limited thereto.

Figure 16:
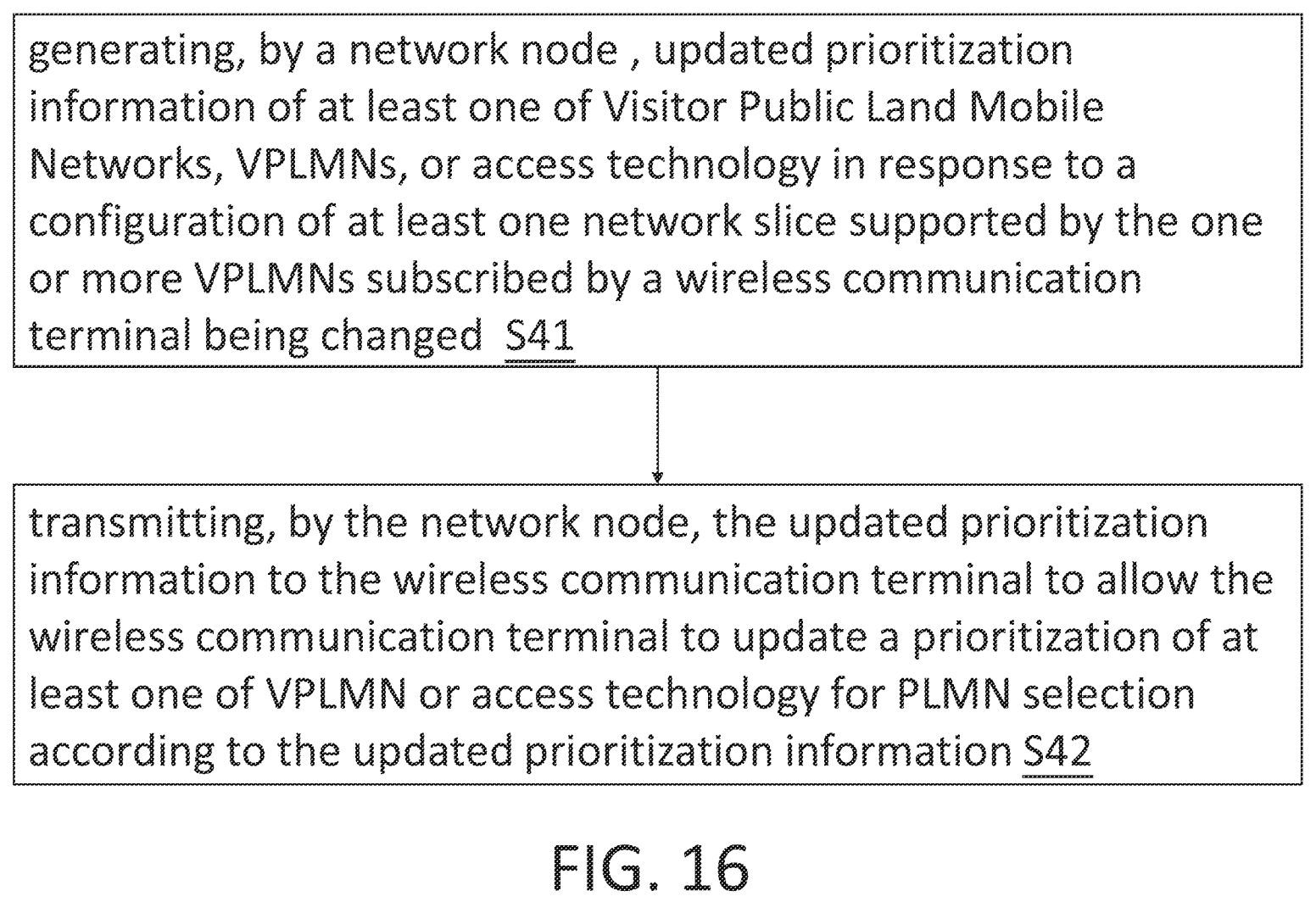

Referring to FIG. 16, in an embodiment, the wireless communication method includes: generating, by a network node, updated prioritization information of at least one of Visitor Public Land Mobile Networks, VPLMNs, or access technology in response to a configuration of at least one network slice supported by the one or more VPLMNs subscribed by a wireless communication terminal being changed (S41); and transmitting, by the network node, the updated prioritization information to the wireless communication terminal to allow the wireless communication terminal to update a prioritization of at least one of VPLMN or access technology for PLMN selection according to the updated prioritization information (S42).

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., a vNSSF or a vPCF). In an embodiment, the wireless communication node may be implemented by using the wireless communication node 40 described above, but is not limited thereto.

Figure 17:
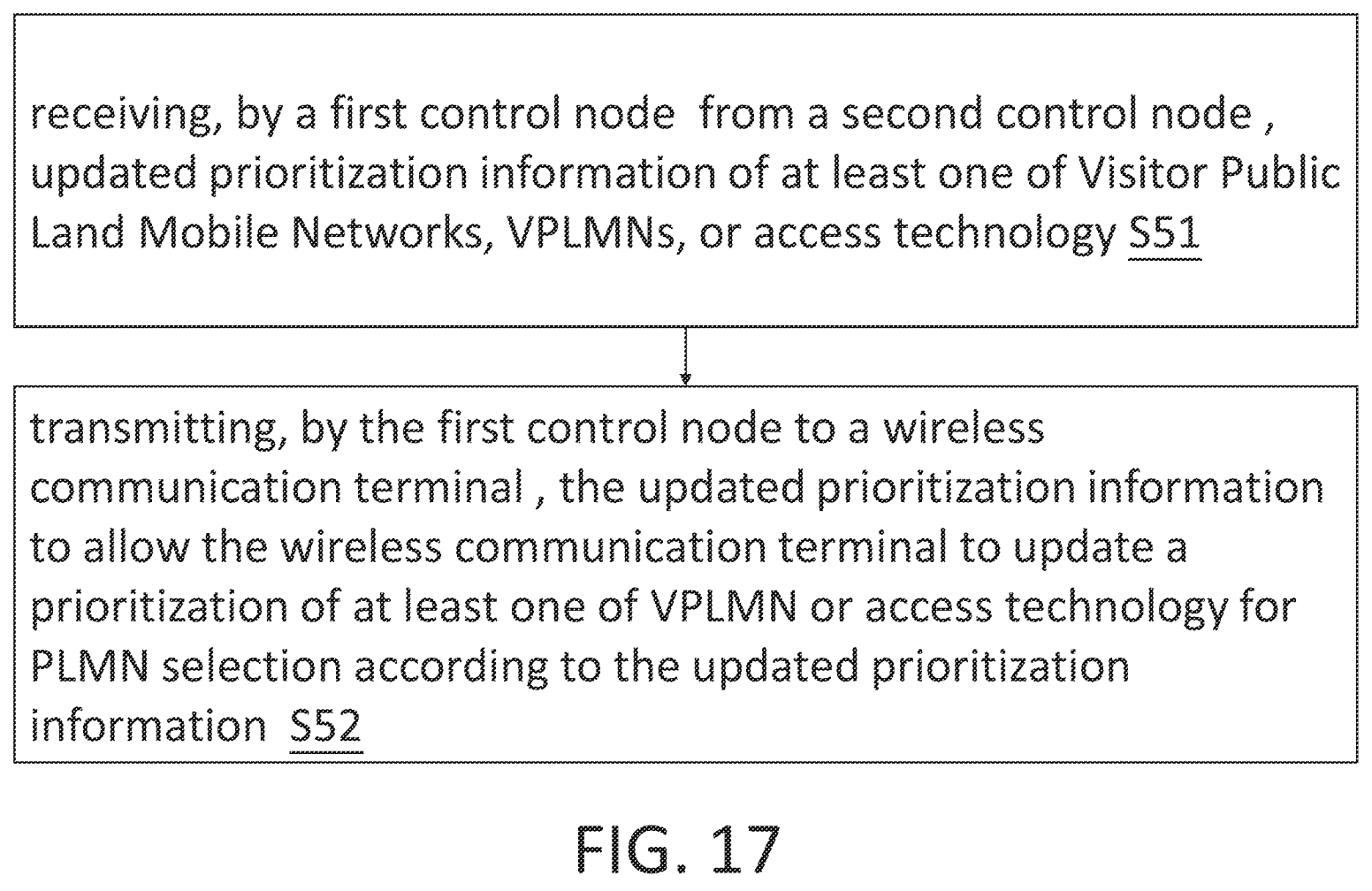

Referring to FIG. 17, in an embodiment, the wireless communication method includes: receiving, by a first control node from a second control node, updated prioritization information of at least one of Visitor Public Land Mobile Networks, VPLMNs, or access technology (S51); and transmitting, by the first control node to a wireless communication terminal, the updated prioritization information to allow the wireless communication terminal to update a prioritization of at least one of VPLMN or access technology for PLMN selection according to the updated prioritization information (S52).

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., an hNSSF or an hPCF). In an embodiment, the wireless communication node may be implemented by using the wireless communication node 40 described above, but is not limited thereto.

Referring to FIG. 18, in an embodiment, the wireless communication method includes: generating, by a second control node, updated prioritization information of at least one of Visitor Public Land Mobile Networks, VPLMNs, or access technology in response to a configuration of at least one network slice supported by the one or more VPLMNs subscribed by a wireless communication terminal being changed (S61); and transmitting, by the second control node, the updated prioritization information to the wireless communication terminal via a first control node to allow the wireless communication terminal to update a prioritization of at least one of VPLMN or access technology for Public Land Mobile Network, PLMN, selection according to the updated prioritization information (S62).

Details in this regard can be ascertained with reference to the paragraphs above, and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:
in response to a change of at least one network slice subscribed by a wireless communication terminal, acquiring, by a unified data node, updated prioritization information of at least one of Visitor Public Land Mobile Networks (VPLMNs) or access technology; and
transmitting, by the unified data node, the updated prioritization information to the wireless communication terminal to allow the wireless communication terminal to update a prioritization of at least one of VPLMN or access technology for Public Land Mobile Network (PLMN) selection according to the updated prioritization information.

2. The wireless communication method of claim 1, wherein the unified data node is configured to transmit a request message to an application node and receive the updated prioritization information from the application node.

3. The wireless communication method of claim 1, wherein the unified data node is configured to notify an application node that at least one network slice supported by one or more VPLMN subscribed by a wireless communication terminal being changed.

4. The wireless communication method of claim 1, wherein the unified data node is configured to acquire the updated prioritization information from an application node via a Unified Data Repository.

5. The wireless communication method of claim 1, wherein the unified data node is configured to transmit an acknowledgment request for the updated prioritization information to the wireless communication terminal.

6. The wireless communication method of claim 1, wherein the unified data node is configured to receive an update acknowledgment message from the wireless communication terminal in response to the updated prioritization information being transmitted to the wireless communication terminal.

7. A unified data node, comprising:
a communication unit; and
a processor configured to acquire updated prioritization information of at least one of Visitor Public Land Mobile Networks (VPLMNs) or access technology, in response to a change of at least one network slice subscribed by a wireless communication terminal; and transmit the updated prioritization information to the wireless communication terminal to allow the wireless communication terminal to update a prioritization of at least one of VPLMN or access technology for Public Land Mobile Network (PLMN) selection according to the updated prioritization information.

8. The unified data node of claim 7, wherein the unified data node is configured to transmit a request message to an application node and receive the updated prioritization information from the application node.

9. The unified data node of claim 7, wherein the unified data node is configured to notify an application node that at least one network slice supported by one or more VPLMN subscribed by a wireless communication terminal being changed.

10. The unified data node of claim 7, wherein the unified data node is configured to acquire the updated prioritization information from an application node via a Unified Data Repository.

11. The unified data node of claim 7, wherein the unified data node is configured to transmit an acknowledgment request for the updated prioritization information to the wireless communication terminal.

12. The unified data node of claim 7, wherein the unified data node is configured to receive an update acknowledgment message from the wireless communication terminal in response to the updated prioritization information being transmitted to the wireless communication terminal.

13. A computer program product comprising a non-transitory computer-readable storage medium including code stored thereupon, the code, when executed by a processor, causing the processor to:
in response to a change of at least one network slice subscribed by a wireless communication terminal, acquire updated prioritization information of at least one of Visitor Public Land Mobile Networks (VPLMNs) or access technology; and
transmit via a transmitter the updated prioritization information to a wireless communication terminal to allow the wireless communication terminal to update a prioritization of at least one of VPLMN or access technology for Public Land Mobile Network (PLMN) selection according to the updated prioritization information.

14. The computer program product of claim 13, wherein the processor is configured to transmit via the transmitter a request message to an application node and receive the updated prioritization information from the application node.

15. The computer program product of claim 13, wherein the processor is configured to notify via the transmitter an application node that at least one network slice supported by one or more VPLMN subscribed by a wireless communication terminal being changed.

16. The computer program product of claim 13, wherein the processor is configured to acquire the updated prioritization information from an application node via a Unified Data Repository.

17. The computer program product of claim 13, wherein the processor is configured to transmit via the transmitter an acknowledgment request for the updated prioritization information to the wireless communication terminal.

18. The computer program product of claim 13, wherein the processor is configured to receive via a receiver an update acknowledgment message from the wireless communication terminal in response to the updated prioritization information being transmitted to the wireless communication terminal.

\* \* \* \* \*